(12) United States Patent
McBurney

(10) Patent No.: US 9,628,958 B1
(45) Date of Patent: Apr. 18, 2017

(54) USER-CONTROLLED, SMART DEVICE-BASED LOCATION AND TRANSIT DATA GATHERING AND SHARING

(71) Applicant: Paul McBurney, Palo Alto, CA (US)

(72) Inventor: Paul McBurney, Palo Alto, CA (US)

( * ) Notice: Subject to any disclaimer, the term of this patent is extended or adjusted under 35 U.S.C. 154(b) by 0 days.

(21) Appl. No.: 14/489,744

(22) Filed: Sep. 18, 2014

Related U.S. Application Data

(63) Continuation-in-part of application No. 14/208,119, filed on Mar. 13, 2014, now abandoned.

(60) Provisional application No. 61/793,049, filed on Mar. 15, 2013.

(51) Int. Cl.
 *H04W 4/02* (2009.01)

(52) U.S. Cl.
 CPC .................. *H04W 4/027* (2013.01)

(58) Field of Classification Search
 CPC ....... H04W 4/027; H04W 4/02; H04W 52/02; G01C 21/16; G01C 21/30; G01C 21/00; G01C 21/34; H04M 3/42
 USPC ...................................... 455/456.1
 See application file for complete search history.

(56) References Cited

U.S. PATENT DOCUMENTS

| | | | |
|---|---|---|---|
| 8,825,383 B1 * | 9/2014 | Kirmse | G01C 21/3415 701/426 |
| 2005/0027441 A1 * | 2/2005 | Sakamoto | G01C 21/3688 701/532 |
| 2005/0079877 A1 * | 4/2005 | Ichimura | G01C 21/32 455/456.1 |
| 2006/0256005 A1 * | 11/2006 | Thandu | G01S 19/34 342/357.74 |
| 2007/0038364 A1 * | 2/2007 | Lee et al. | G01C 21/20 701/532 |
| 2009/0005018 A1 * | 1/2009 | Forstall | H04M 3/42348 455/414.1 |
| 2009/0005975 A1 * | 1/2009 | Forstall | G01C 21/20 701/533 |
| 2012/0253665 A1 * | 10/2012 | Forstall | G01C 21/20 701/450 |
| 2013/0006674 A1 * | 1/2013 | Bowne | G06Q 10/0639 705/4 |
| 2013/0030934 A1 * | 1/2013 | Bakshi | G06Q 20/40 705/18 |
| 2013/0054130 A1 * | 2/2013 | Ye | G01C 21/165 701/409 |
| 2013/0080255 A1 * | 3/2013 | Li | G01C 22/006 705/14.58 |
| 2013/0324196 A1 * | 12/2013 | Wang | H04W 52/0254 455/574 |
| 2014/0171098 A1 * | 6/2014 | Marti | G01S 5/0252 455/456.1 |

* cited by examiner

*Primary Examiner* — Nathan Taylor
(74) *Attorney, Agent, or Firm* — Useful Arts IP

(57) ABSTRACT

Systems and methods are provided that gather and store time-series location information or other time-series information of a user using a mobile electronic device such as a smart phone and place that location information or other information under control of the user. A variety of types of analytics may be applied to the location information by consent of the user, and results may be shared by electronic consent of the user in order to provide benefit to the user. The benefit may be commercial, personal, social, etc. The information may be stored in encrypted form.

31 Claims, 19 Drawing Sheets

USER:

PERIOD 1/1/2014 TO 3/31/2014

| LOCATIONS | ROUTES | ... | ACTIVITY |

HOME (STREET)
WORK (STREET)
...

LOGOUT

USER:
PERIOD 1/1/2014 TO 3/31/2014

LOCATIONS | ACTIVITY

ROUTES    COUNT    ...    DISTANCE (AVE.)    PROFILE
HOME TO WORK
WORK TO HOME
...

LOGOUT

USER:
PERIOD 1/1/2014 TO 9/31/2014

| ACTIVITY | LOCATIONS | ... | ROUTES |
|---|---|---|---|
| 1/1/2014 | MEDIUM | | |
| 1/2/2014 | MEDIUM | | |
| ... | | | |

LOGOUT

USER:

| REQUESTS | ROUTES | ... | ACTIVITY | | | |
|---|---|---|---|---|---|---|
| FROM | FOR | TYPE | PERIOD | DATASET(S) | RESPONSE | |
| BetterSure | Auto insurance discount | Data metrics | 1/1/2013 to 1/1/2014 | Routes | ACCEPT | REJECT |
| BetterLife | Life insurance discount | Actual data | 1/1/2013 to 1/1/2014 | Activity | ACCEPT | REJECT |
| PrimeCard | Verify card transaction | Actual data | 1/1/2013 to 1/1/2014 | Routes | ACCEPT | REJECT |
| ... | | | | | | |

LOGOUT

NETWORK FIXES

NETWORK FIX RANGE

CELL SITE RANGE

USER-CONTROLLED, SMART DEVICE-BASED LOCATION AND TRANSIT DATA GATHERING AND SHARING

BACKGROUND

Mobile electronic devices such as smart phones, tablets and the like are being used for an increasing variety of purposes. One example is usage-based insurance (UBI) for automobiles. Information about how a driver drives is used to more accurately set an insurance premium for that driver. Typically, driving information is gathered by a hardware "dongle" attached to the car's electronic system. More recently, efforts have been made to migrate such an information gathering function to smart phones. A driver carries his or her smart phone while driving. A background application runs on the smart phone and gathers driving information.

Mobile electronic devices such as smart phones have also begun to be used for fleet tracking. Like UBI, fleet tracking has been performed primarily using dedicated vehicle hardware. Such tracking has typically relied upon global navigation satellite systems (GNSS) such as GPS, augmented as needed by dead reckoning navigation during periods of GPS unavailability. Map matching techniques have been used to refine and display location information. Mobile electronic devices such as smart phones are equipped with a variety of communication and sensing capabilities. A typical smart phone is capable of determining its location using GPS, or by other various means using, for example cell site transmissions, WiFi transmissions, etc. Using smart phones for fleet tracking removes the need for specialized hardware.

Mobile electronic devices have also given rise to location-based services, which rely upon receiving location information of the smart phone. Such services are typically episodic in nature; for example, when a device comes within range of a location offering goods or services, an advertisement for such goods or services may be displayed.

There remains a need for a system that uses mobile electronic devices such as smart phones in a way that allows the user control of location information to benefit the user.

BRIEF DESCRIPTION OF THE DRAWING

The present invention may be further understood from the following detailed description in conjunction with the appended drawing figures. In the drawing:

FIG. 4A is an example of a user interface screen display that may be used in the system of FIG. 1.

FIG. 4B is an example of another user interface screen display that may be used in the system of FIG. 1.

FIG. 4C is an example of another user interface screen display that may be used in the system of FIG. 1.

FIG. 4D is an example of another user interface screen display that may be used in the system of FIG. 1.

FIG. 9 is a diagram illustrating aspects of operation of the mobile electronic device during movement of members of a group within a mall or the like.

DETAILED DESCRIPTION

Summary

Figure 1:
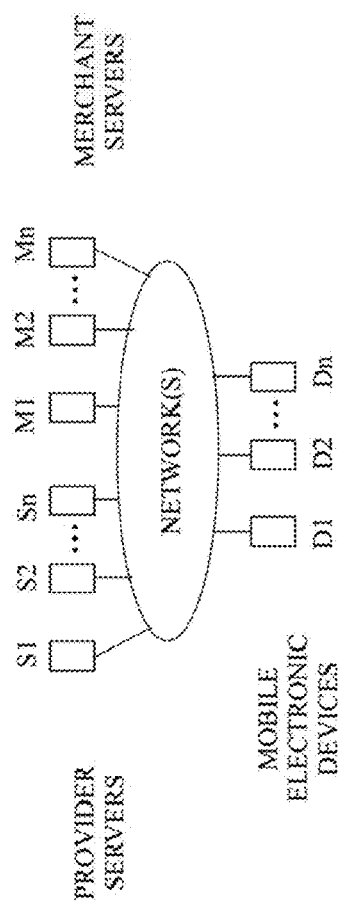
FIG. 1 is a diagram of a location information system.

As described herein, systems and methods are provided that gather and store location information or other information of a user using a mobile electronic device such as a smart phone and place that location information or other information under control of the user. A variety of types of analytics may be applied to the location information or other information by consent of the user, and results may be shared by consent of the user in order to provide benefit to the user. The benefit may be commercial, personal, social, etc. The information may be stored in encrypted form.

In one embodiment, a method of using data sequence includes: using a mobile electronic device to gather a data sequence of a user spanning a time of one or more hours; storing the data sequence on one or more servers; and electronically sharing information comprising at least one of the data sequence and data derived therefrom with one or more third parties upon electronic approval by the user. An application running on the mobile electronic device may be used to gather the data sequence, and the application may augment the data with a periodic time indicator enabling operation and non-operation of the application to be determined. The data sequence may be stored long-term, for example for at least one month, with the user being allowed to delete some or all of the data sequence. The data sequence may be location data, and the information may be location information. The user may choose to share such information for various purposes, including for example approval or disapproval of a credit-card transaction, facilitating interaction with trusted persons, etc. The data sequence may be sensor data, and the information may be sensor information. The user may choose to share such information for various purposes, including for example insurance rating purposes (auto insurance, life insurance, etc.).

DESCRIPTION

Systems and methods are provided that gather and store location information or other information of a user using a mobile electronic device such as a smart phone and place that location information or other information under control of the user to be shared or not shared at the discretion of the user. In various embodiments, the systems and methods may:

1) Produce location and context in-between location reports invoked by the OS or by other programs periodically invoked by the customer, thereby enhancing value.

2) Operate in ways that allow the customer to improve their privacy and minimize unwanted availability of location information, for example to other applications.
3) Be able to establish home bases, which are generally home and work. People spend significant portions of their time in these places, and by acknowledging these bases, they can establish a higher degree of trust. Typically, home bases change only when changing address or work. However, vacation locations can also become home bases.
4) Identity an in-group by using dialogs to acknowledging frequent proximity to other devices.
5) Identify when moving with one or more in-group members.
6) After moving, identify that in-group members are in different location and begin sharing information to know something of their context and allow that person to be found by walking to them without requiring their action.
7) Compute and record a continuous location trajectory using low power sensors for the purpose of determining location context. To validate movement from a home base to a current location, redundancy in the observations may be required. Such redundancy reduces the effects of inaccuracy in the readings and also minimizes the chance that a person can purposely spoof their location (e.g, by using GNSS signal replicators or WiFi signal replicators). While it is possible to confuse a local area, it should not be possible to do so over a large area. Thus, the redundancy can be used to provide integrity and confidence in the current location.
8) Minimize power consumption from both GPS and data channel communication to reduce power consumption.
9) Record a "bread crumb" path (e.g., using sensor readings) of how a person traveled to their current location.
10) Maintain and record a continuous dynamic context distinguishing movement and a static condition. The movement may be driving, walking, biking, on the train, etc. Flying might also be a category of movement to the extent tracking is allowed by regulations.

Referring now to FIG. 1, a diagram is shown of a location information system. Mobile electronic devices D1-Dn are coupled to one or more networks, such as the internet. The mobile electronic devices may be smart phones, for example. The number of mobile electronic devices is not limited and may number in the millions, world-wide.

Also coupled to the one or more networks are provider servers S1-Sn and merchant servers M1-Mn. There is no limit to the number of such servers, which may be located world-wide. The servers will typically be coupled to the one or more networks in wired fashion, whereas the mobile electronic devices will typically be coupled to the one or more networks wirelessly. Conceptually, the servers S1-Sn and M1-Mn may be considered part of the cloud as that term is used in reference to cloud computing.

Figure 2:
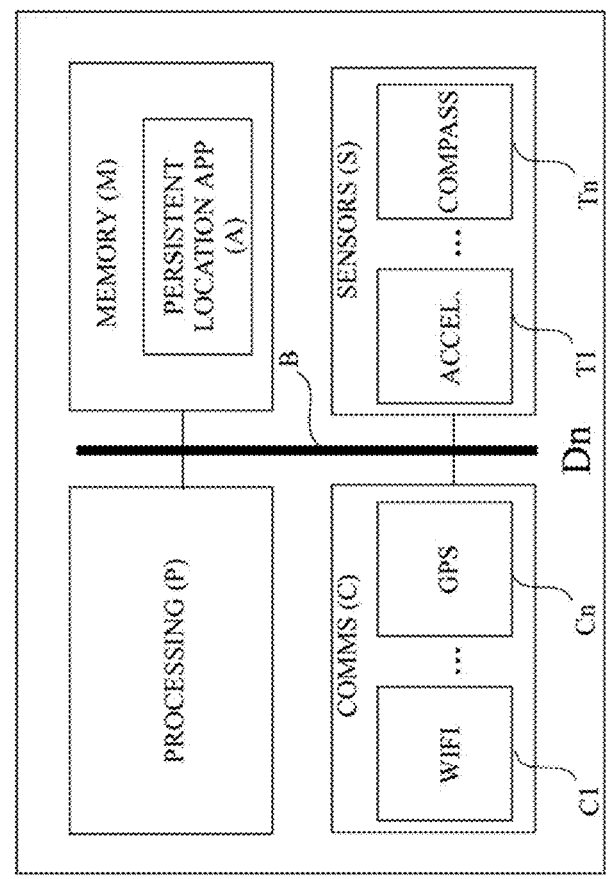
FIG. 2 is a diagram of a mobile electronic device that may be used in the system of FIG. 1.
Figure 3:
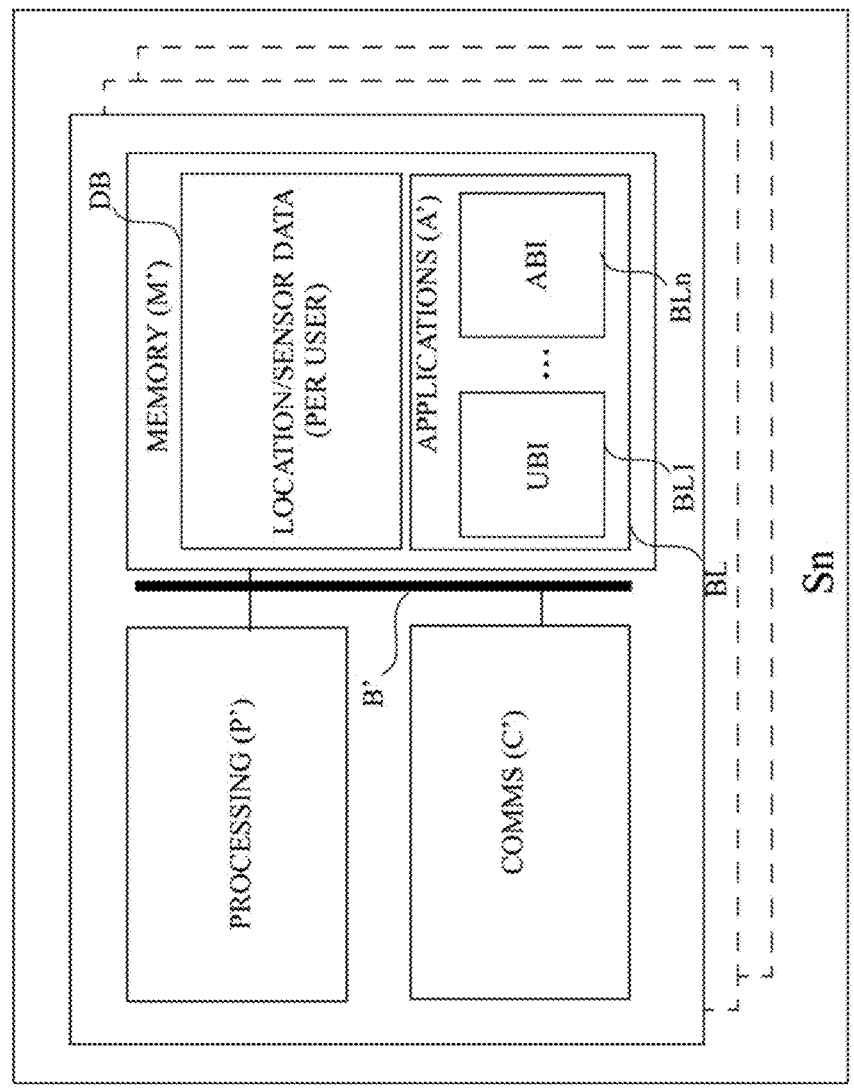
FIG. 3 is a diagram of a server or server node that may be used in the system of FIG. 1.

A diagram of a mobile electronic device that may be used in the system of FIG. 1 is shown in FIG. 2. A processing block P is coupled to a memory block M by means of one or more buses B, which may be inter-chip buses or intra-chip buses. Also coupled to the one or more buses are a communications block C and a sensor block S. The communications block C may include various communications modules C1-Cn such as WiFi, cellular, GPS, etc. The sensor block S may likewise include various sensor modules T1-Tn, such as accelerometer, gyro, magnetometer (compass), light sensor, proximity sensor, barometer, temperature sensor, other environmental sensors, etc.

The memory M includes a persistent location application, or app, A. The persistent location app is configured to run in background whenever the mobile electronic device is running Its various functions are described below.

A diagram of a server that may be used in the system of FIG. 1 is shown in FIG. 2. A processing block P' is coupled to a memory block M' by means of one or more buses B, which may be inter-chip buses or intra-chip buses. Also coupled to the one or more buses are a communications block C'.

The memory M' includes a database DB that stores location/sensor data on a per-user basis. It also includes a business logic block BL that may include various business logic applications BL1-BLn. Examples of business logic applications include, for example, usage-based insurance, (UBI), activity-based insurance (ABI), credit card verification, social network verification, etc. Their various functions are described below.

A server may include a single processing instance like that described or multiple processing instances.

The following screen displays are illustrative of possible applications of the system of FIG. 1 (selected from among myriad possible applications). Referring to FIG. 4A, a user is assumed to be logged in. A Locations tab is selected from among various display tabs. A date range is specified, and the locations tab displays locations that have been visited by that user during the specified period. The locations may be sorted according to time spent at those locations and may include, for example, home, work, etc. The ability to display maps of the locations may be provided.

Referring to FIG. 4B, a Routes tab is displayed for the same period. The routes may be sorted according to cumulative distance, frequency, or other relevant criteria. Columns may be provided that specify the number of times the route was traveled, the average distance, a profile of the route (freeway, surface streets), etc. The ability to display maps of the routes may be provided.

Referring to FIG. 4C, an Activity tab is displayed for the same period. For each date during the period, the user's activity for that day is graded (for example, low, medium, high). In some instances, the user may wear a fitness bracelet that may interface with the persistent location app A. If so, further details may also be displayed, including heart rate information such as a heart rate graph or histogram. If the user walked or biked for a sustained period, details concerning such walking or biking may be displayed. In addition, if the user visited a known fitness location (a gym, a hiking location, etc.), that information may also be displayed.

Referring to FIG. 4D, a Requests tab is displayed. The Requests tab allows the user to accept or reject requests for access to the user's data. The request may specify, for example, the requestor, the type of request (whether for data metrics or actual data), a time period, one or more datasets (routes, activity, etc.), and any other pertinent details. The user may accept or reject the request. If the request is accepted, then data will be sent to the requestor in accordance with the request.

Figure 5A:
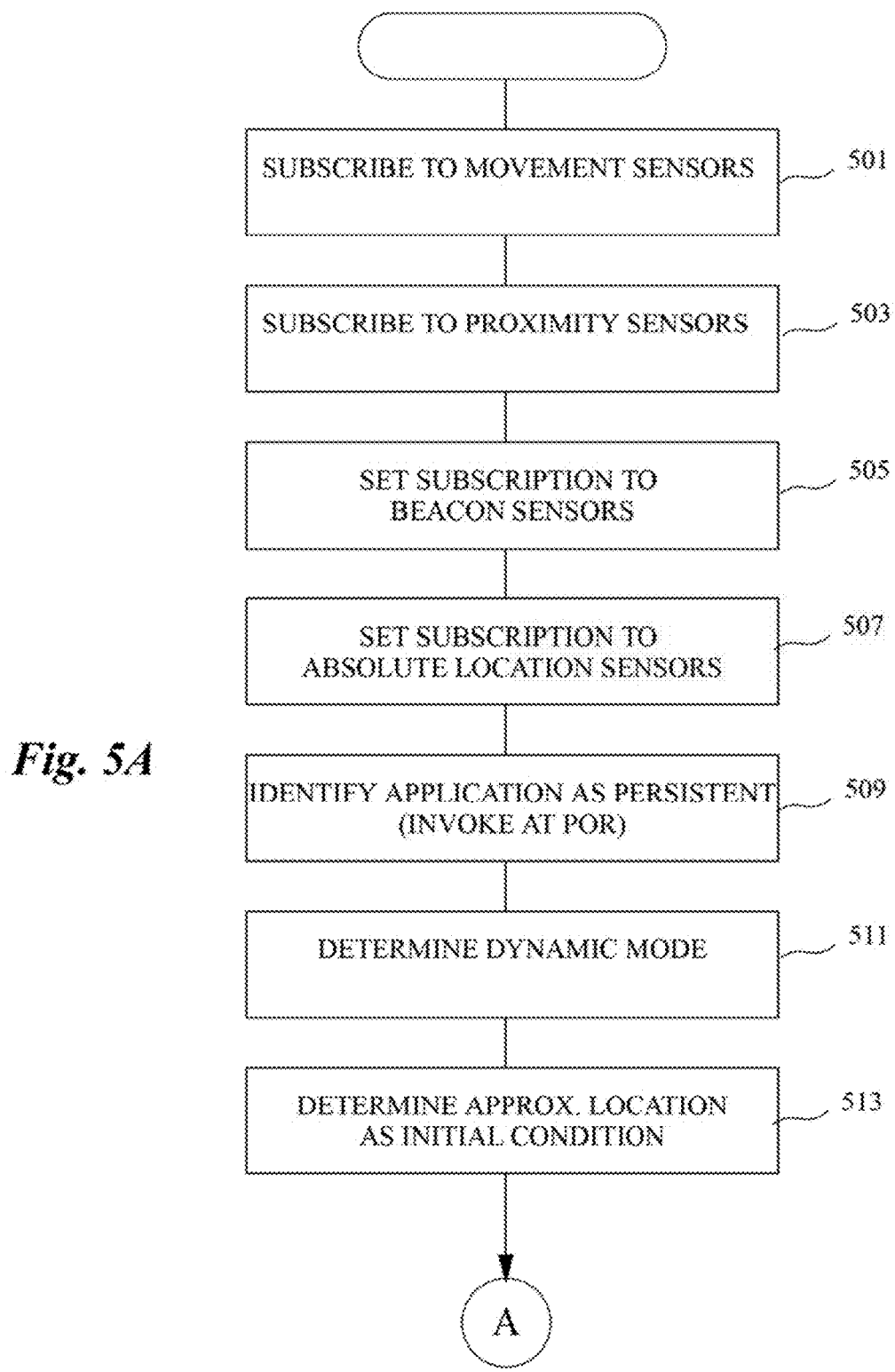
FIG. 5A is a diagram illustrating in part operation of a mobile electronic device of FIG. 1.

A diagram illustrating in part operation of a mobile electronic device of FIG. 1 is shown in FIG. 5A. Steps 501 through 509 relate to application initialization and setup. In step 501, the application calls the device OS to subscribe to movement sensors. In step 503, the application subscribes to proximity sensors. In steps 505, the application sets up a subscription to beacon sensors. At step 507, the application sets up a subscription to absolute location sensors. The application is then identified to the OS as being persistent such that the application is invoked upon power on/reset (POR).

Following application initialization and setup, in step 511, the application determines a dynamic mode of the mobile electronic device. In one embodiment, the dynamic modes include such modes as driving, biking, walking, train, etc. The dynamic modes further include a static mode—the lack of dynamic motion, and possibly other modes, such as a table mode.

The dynamic mode may be determined using various known methods. The following Table compares operation in different modes in accordance with one illustrative embodiment.

| 1. TABLE MODE | |
|---|---|
| (Confident Not Moving) | |
| WiFi Scan | Scan every 1-2 minutes (lingering for one hour or more may be indicative of domicile) |
| WiFi connection ON/OFF | Capture each time connection started or ended |
| Accelerometer | Sample at low speed (e.g., 1 Hz). Fast enough to detect exit of table mode. |
| Magnetometer | Can be off |
| Gyro | Can be off |
| Barometer/proximity sensor/light sensor | Sample at very low speed (every 1-5 minutes) to measure environment |
| Cell tower | Identify best SNR (and/or download speed) every 1-2 minutes |

| 2. DRIVING MODE | |
|---|---|
| (Change in acceleration within bounds for prolonged time; magnetometer stable) | |
| WiFi Scan | Used to obtain reference points. Scan every 10-20 seconds. Less frequently if driving straight, more frequently during turns. |
| WiFi connection ON/OFF | Capture each time connection started or ended |
| Accelerometer | Sample at high speed (e.g., 15 Hz) to get speed, turns. Also to detect steps indicating end of drive. |
| Magnetometer | Sample at approx. 1 Hz to get direction for dead reckoning and trajectory verification |
| Gyro | Can be on if doing navigation |
| Barometer/proximity sensor/light sensor | Sample at approx. 1-5 Hz to detect hills (baro.) and to detect holding phone while driving (prox.) |
| Cell tower | Listen for rate when SNR changes substantially |

| 3. TRAIN MODE | |
|---|---|
| (Change in acceleration within bounds for prolonged time; magnetometer variation high; can post detect by map matching - positions close to train tracks) | |
| WiFi Scan | Scan every 1-10 seconds. |
| WiFi connection ON/OFF | Capture each time connection started or ended |
| Accelerometer | Sample at high speed (e.g., 15 Hz) to detect movement of the train and steps indicating end of ride. |
| Magnetometer | Sample at approx. 1 Hz; switch to 15 Hz periodically to verify train mode |
| Gyro | Can be off |
| Barometer/proximity sensor/light sensor | Sample every 1-10 seconds to detect flat and verify train (baro.) |
| Cell tower | Listen for rate when SNR changes substantially; used to verify trajectory |

| 4. "STEPS" (BIKING OR WALKING) | |
|---|---|
| (Entered when a large number of steps is detected) | |
| WiFi Scan | Scan every 1-5 seconds. Provides reference points for location, e.g., to get to a store |
| WiFi connection ON/OFF | Capture each time connection started or ended |
| Accelerometer | Sample at high speed (e.g., 15 Hz) to detect steps. |
| Magnetometer | Sample at approx. 1 Hz to get walking/biking trajectory direction and verify trajectory |
| Gyro | Can be off; possibly on for navigation |
| Barometer/proximity sensor/light sensor | Sample at approx. 1 Hz to detect stairs/elevation (baro.); every 1-5 second (prox.) or at variable rate depending on change |
| Cell tower | Capture changes to provide reference points |

In step 513, an approximate location of the mobile electronic device is determined as an initial condition. In one embodiment, this approximate location is determined using beacon sensor information if possible; otherwise, it may be determined using absolute location sensors. Often, a network location fix using beacon sensors may be obtained from the OS of the mobile electronic device. In other instances, the application may determine its own network fix. For example, a scan may be performed of beacon sensors. The set of accessible beacon sensors may be identified to a server, which may then identify and send to the mobile electronic device a portion of a database containing location information for those beacon sensors and others in the same vicinity. If location information is unavailable, the mobile electronic device may use an absolute position sensor to determine position. This information will in due course be uploaded to a server, helping to further populate the database. In some instances, location information may be embedded in the beacon signals of beacon sensors, making the use of a database unnecessary.

Figure 5B:
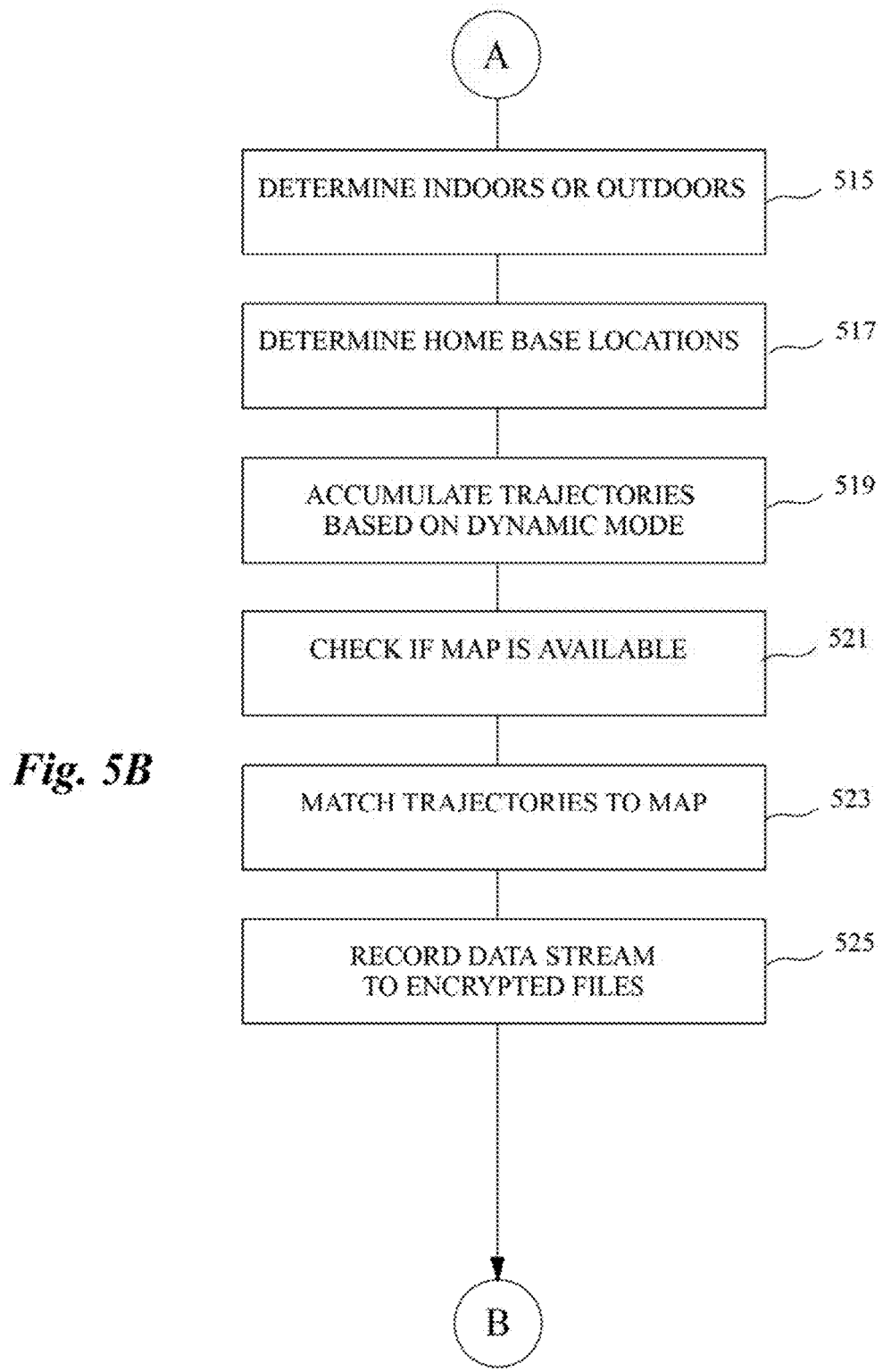
FIG. 5B is another diagram illustrating in part operation of a mobile electronic device of FIG. 1.

Referring to FIG. 5B, in step 215, a determination is made whether the mobile electronic device is indoors or outdoors. This determination may be made in any of various ways. For example:

1) Count the number of WiFi access points available. There may be a special WiFi SSID passing through an entry point to a building. If the mobile electronic device monitors the received signal strength indicator (RSSI) then it may observe an increase as the user approaches and decrease as the user moves away.
2) The light sensor can be used to detect non-sunlight and indicate indoor lighting.
3) The WiFi SSID can be detected as being indoors.
4) Businesses can also register their WiFi MAC and SSID as being an indoors AP. Reception of these APS means the mobile electronic device is close to the business. This method is highly reliable. Thus, when available, this technique may be used rather than other methods, including for example methods based on RSSI of WiFi APs.

In step 517, the system determines home base locations (e.g., home, work). In one embodiment, candidate locations for home bases require observation of multiple beacon sensors for verifiability. Candidate locations also require a specified "loitering length." Candidate locations for home bases may be determined by the mobile electronic device or by one or more servers in communication with the mobile electronic device. In one embodiment, the system presents candidate home bases to the user for the user to verify.

In step 519, the system accumulates trajectories with observation frequency being based on the dynamic mode. A continuous tracking system has major advantages over an on-demand solution (including the ability to establish regular domicile points or occupation points where a user spends a considerable amount of time). In one embodiment, the system computes and records a continuous location trajectory, using low power sensors to the extent possible, for the purpose of determining location context. To validate movement from a home base to a current location, redundancy in the observations may be required. This redundancy reduces the effects of inaccuracy in the readings and also minimizes the chance that a person can purposely spoof their location by use GNSS signal replicators or WiFi signal replicators. While it is possible to confuse a local area, it should not be possible to do so over a large area. Thus, the redundancy can be used to provide integrity and confidence in the current location.

In one embodiment, having determined an initial location, the system uses sensor observations and, as needed, dead reckoning navigation and map matching, to continuously update location. When using dead reckoning, a rate of error accumulation may be assumed, depending on the dynamic mode. Similarly, error information may be determined from map matching. When an error threshold is reached, if location cannot be established using low power sensors, an absolute position sensor reading (e.g., GPS or Network Fixes from the OS) may be obtained as needed.

The continuous collection of WiFi access points (APs) also provides an ability to verify a general location. Family or business names in APs can be searched from various websites like the Yellow Pages to provide an address that can also be converted to latitude, longitude using geo-coding services.

In step 521, if the mobile electronic device is indoors (for example, if the system determines it is receiving indoors APs), then it searches for any indoor maps associated with this location. It can then perform map fitting with the indoor maps (step 523). Note that indoor maps can be converted from general wall descriptors to path descriptors by identifying hallways and walk ways and then converting these areas into a single way (using open street maps formats, for example).

If the mobile electronic device is outdoors or detects significant position change such as a kilometer, it checks whether a street map database is available and if so downloads an initial map database that correlates beacon information with street locations. The map database may be based on user input or may be based on vendor-acquired information. The device performs map fitting with the street map database. If the current location is near a border of the map, a new map is downloaded if available.

Figure 5C:
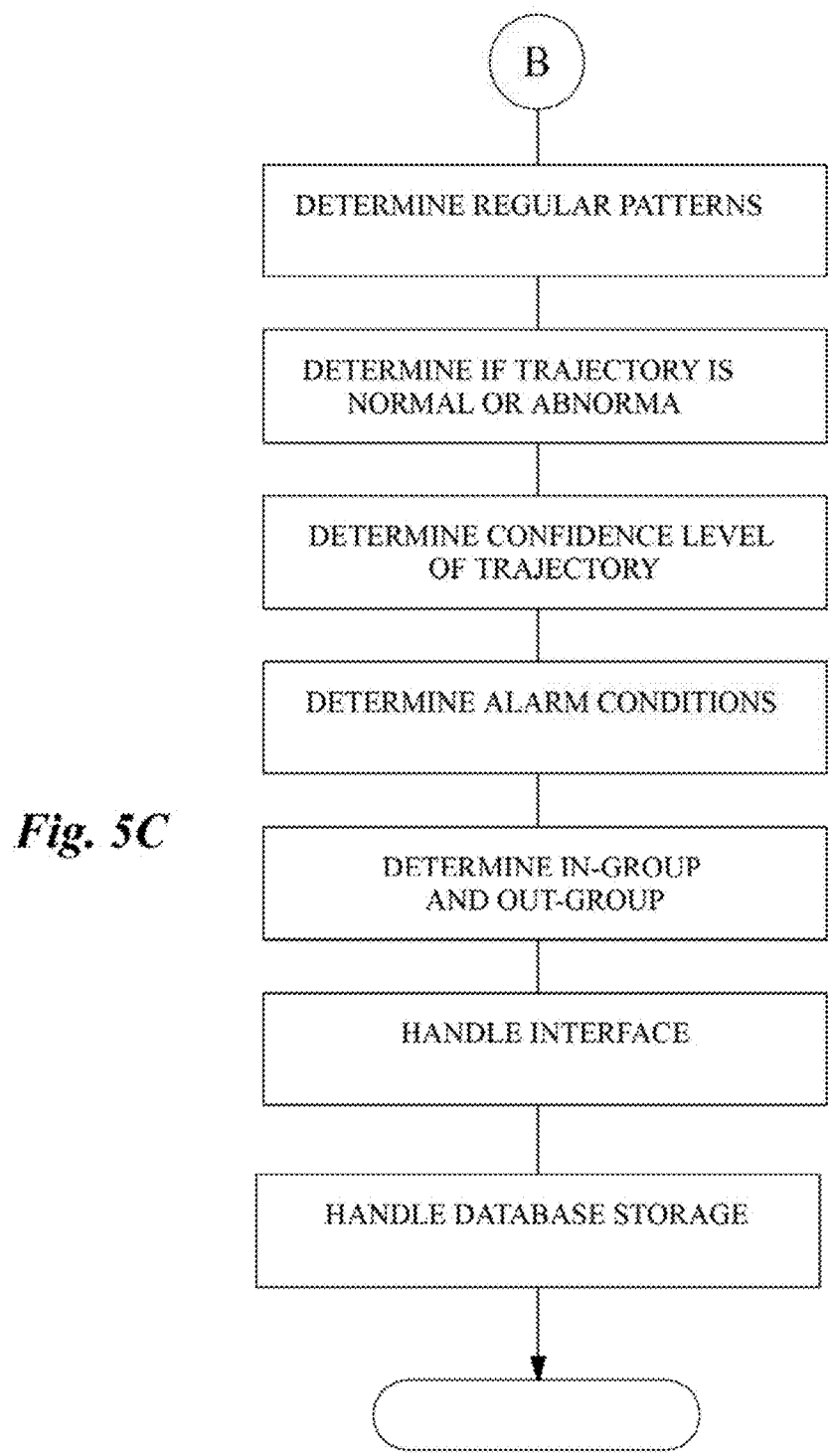
FIG. 5C is another diagram illustrating in part operation of a mobile electronic device of FIG. 1.
Figure 5D:
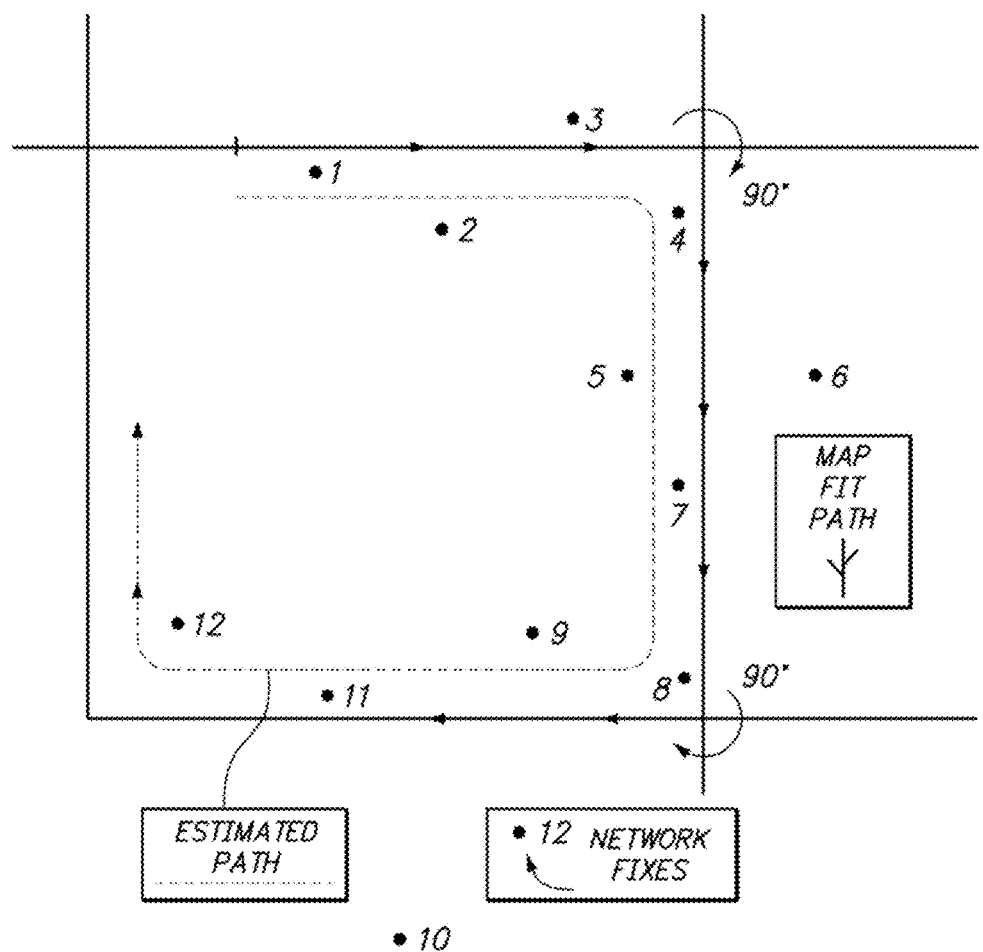
FIG. 5D is a diagram illustrating an example of map matching.

An example of map matching is illustrated in FIG. 5D. A street grid is shown in solid line. Network fixes 1-12 are shown as dots. Map matching may use a forward-backward smoothing algorithm to arrive at a map fit path, shown in dashed line.

In step 525, the system records trajectory information to encrypted files.

Referring to FIG. 5C, having recorded trajectory information, various operations may then be performed using that information. Note that these operations may be performed by the mobile electronic device or by one or more servers after the mobile electronic device has uploaded trajectory information to the servers. In step 527, regular patterns, or routes, are determined. Such patterns may be both spatial and temporal. In step 529, trajectories may be categorized as normal or abnormal based on the regular patterns.

In step 531, confidence levels or verification status may be determined for various trajectories. For example, if a trajectory is "over-determined" (i.e., supported by redundant observations), it is recorded as verified. If it is not over-determined but is continuous, it is recorded as verified. Otherwise, it is recorded as not verified.

In step 533 alarm conditions are processed. For example, extreme deceleration may indicate a crash condition, resulting in an alarm being sent to an in-group member as described below. An alarm condition may be based on a predetermined, agreed-upon daily schedule. The system may then monitor activity as being in or out of schedule. An alarm may be sent if the schedule is not being followed.

In step 537, in-groups and out-groups are determined. An in-group is a group of users with which the system shares information. An out-group is a group of users with whom interaction is to be avoided. These groups may be set by user interface actions. They may also be set by co-location at a high enough rate (e.g., family members, work group, etc.). The system may determine if users are traveling together and establish a travel in-group. In-group members may be sent status information and may be sent the range and bearing between all in-group members. Such communication may use peer-to-peer communication, SMS, third-party web-based messaging, etc.

In-group members can also be determined on the server by comparing locations or Aps collected. In such a service, members can search for new members among social networking groups by allowing a search of times and locations that the candidate members were co-located either at the same time, or frequently at the same location though at different times. This common location can determine a shared interest and merit allowing reaching out to that person.

In the case of out-group members, the system may record that an out-group member is nearby. It may send an alarm in the case of proximity to a non-allowed out-group member.

In steps 537 and 539, user interface and database storage operations are handled. Interface operations may include, for example, the user registering with a managing storage company and setting preferences. For example, preferences may be set to allow no communication with outside marketers, to allow communication with any outside marketer, to allow communication with marketers in user defined areas, etc. For example, a user may choose to communicate with marketers within the categories of food, shopping, entertainment, etc. Similarly, a user may choose to share information concerning activities, lifestyle (homebody, shopper, has children), etc.

A somewhat more detailed flowchart and description of operation is set forth in Appendix B.

In terms of database storage, in one embodiment, encrypted data is uploaded to the user's account opportunistically, for example when the mobile electronic device is idle and near a WiFi access point. Data can also be sent using the cellular modem in case the user accepts this and the data upload cost is not a burden. This enables more frequent communication with the server and in group members.

In one embodiment, the mobile electronic device periodically uploads to one or more servers a collection of text files containing location and sensor information. In an illustrative embodiment, five different files are uploaded daily, including a WiFi Connection file, a WiFi file, a Phone (cell site ID) file, an Events file and a Raw file. Typically, the total size of the upload may be a megabyte or a few megabytes. In an exemplary embodiment, these files, some of which have a histogram format, contain the following information.

WiFi data base file: (WiFi SSID, BSSID, latAvg,lonAvg, AltAvg,errorSigmaAvg,cnt, weekly histogram of when received, first date observed, last date observed)

Connection data base file: (WiFi SSID, BSSID, latAvg, lonAvg,AltAvg,errorSigmaAvg,cnt, weekly histogram of when connected, first date observed, last date observed). The downlink and uplink data speeds, based on RSSI and also the transmitter capabilities can be saved. This data can be useful to indicate locations where phone can observe good bandwidth and might be interesting to parties wishing to upload or download large data without incurring the cost penalty from the cellular modem allotted bandwidth.

Cell Site Phone data base file: (CarrierName, Country, MNC, MCC, BaseStationID, NetworkId, SystemID, weekly histogram of when connected, first date observed, last date observed)

Raw data base file.

Event data base file.

The histogram information contained in the first three files provides a convenient way of determining location patterns and has a compressed characteristic Generally speaking, the Raw data base file records low frequency information and the Event data base file records analyzed or low-frequency information derived from high-frequency information. For example, low-frequency information may include signal availability information, connectivity information, etc. High-frequency information may include sensor readings such as accelerometer readings.

A typical Raw data base file may contain, for example, header-type information including calendar information, software version information, etc. The body of the file may contain time-stamped entries concerning signal availability, connectivity, low-frequency sensor readings, etc. Interspersed at regular (e.g., one second) intervals may be "heartbeat" entries as described more fully below. In one exemplary embodiment, the Raw file contains a repeating sequence of the following information:

WiFi scan: used to determine location reference points. This scan contains a list of APs visible. The data can be further sorted and the WiFi speed analysis summary can be included to simplify the processing on the server.

phoneListeners SNR: used to determine location reference points. This contains the cell site type (that is, LTE, 3G, CDMA, etc), the base station type and SNR or RSSI.

Proximity: used to determine use of handset (e.g., while driving). Is a measure of how close the phone is to the holder's head. Can also be used to indicate phone use.

Light: auxiliary information; various uses. Indicates the light intensity where the phone is. Can be used to indicate the type of environments the user frequents.

Magnet: used to determine mode, direction. This can be the raw 3D magnetometer values or the processed magnitude, time series variation, and heading.

Location: fixSource (GNSS, or other type), latitude, longitude, altitude (if available), speed and heading (if fix source is GNSS), accuracy. The location record can also indicate if the fix was requested by the user or was made available due to location requests from other apps or the OS. This is useful for monitoring the impact of the persistent application or how much location is being monitored.

Heartbeat is a written to the raw file and also to non-volatile memory at a regular interval of a minute. The heartbeat in the raw file is used to verify that the app is active in periods when there are no other events written to any other file. This is important for insurance applications to verify that the app is active and capturing all activity. Heartbeat contains the device ID information, system time at an interval such as every minute, and in the case of turn on it contains the time interval between current time and the heartbeat last written to non-volatile memory. This is useful for verifying that the application is active (not canceled by the user).

In one exemplary embodiment, the Event data base file contains information concerning events such as the following:

ACCEL: acceleration 3D magnitude exceeds a threshold. This acceleration is estimated from the accelerometer after removing the gravity component from the 3 axes. The acceleration is a filtered parameter so as to remove short term vibration noise. Acceleration in each axis is estimated by integrating the filtered jerk which is the average of a moving window of accelerometer differences. This eliminates the need to use the conventional leveling technique that is commonly used with accelerometers to remove gravity from each component. Velocity is also estimated by integrating the acceleration which is formed from the integrated average jerk.

ACEL_DIFF_HISTO: captures change in acceleration between consecutive sensor readings in the form of a histogram. This data is useful for providing a population snapshot of the dynamic environment. This histogram will contain the rapid large acceleration changes that would be filtered in the acceleration estimated by intergrating the average jerk. It is useful for UBI to observe very short term changes in acceleration that would be diminished in the average jerk.

DYNAMIC_AFTER_STATIC: change in state from static to dynamic. This is a useful event to trigger the output of the starting acceleration when leaving a static mode. It can indicate if a driver is smooth or forceful when accelerating from a stop.

HAND: hand motion of phone detected. These hand events identify when the phone reference frame is changing, indicating likely hand movement. They are useful for characterizing phone use, especially while in a driving mode.

JERK: rate of change of acceleration exceeds a threshold. Jerk events are obtained by averaging a moving window of accelerometer differences across a longer time interval such as 1-2 seconds and are less sensitive to short term accelerometer noise.

STATIC: phone detected to be stationary. These events indicate that the device is not moving. The acceleration saved with the event implies the acceleration during braking and can be used to identify hard braking events that are useful for UBI.

STEPS_HISTO: Contains a histogram of the time between each detected step. It is useful for determining the average walking gate or period of user movement for categorizing the user's activity levels.

STEPS_SESSION_STARTED: this event indicates when stables steps are detected and indicates the beginning time of a walking session.

STEPS_SESSION_FINISHED: this event indicates that the end of a steps session. It will contain the number of steps and also other characteristics of the steps such as whether they were of strong or weak amplitude, and whether they were fast or slow. This is more useful than simply the estimate of the number of steps. Business logic can use these step sessions to analyze how long or in what dynamic fashion a person loitered in a particular store location.

TABLE_START: this event captures the time when it is determined that the phone is static for a long time, likely indicating that it is in a stable environment, such as sitting on a table.

TABLE_END: this event identifies the end of table mode detected (special case of static). It indicates that the phone was likely picked up, or that the surface it is attached to is likely moving.

TRIP_START: beginning of trip mode detected. This event indicates that phone is moving in drive mode. The start time is useful for identifying the start time of driving.

TRIP_END: end of trip mode detected. This event captures the time when driving mode was ended. It will contain the end time and time duration of trip.

Hand motion is detected using acceleration characteristics in pitch, roll and yaw. Since hand motion can produce extreme acceleration values, it is useful to be able to remove these values for purposes of some calculations, for example in the application of Usage Based Insurance.

Figure 6A:
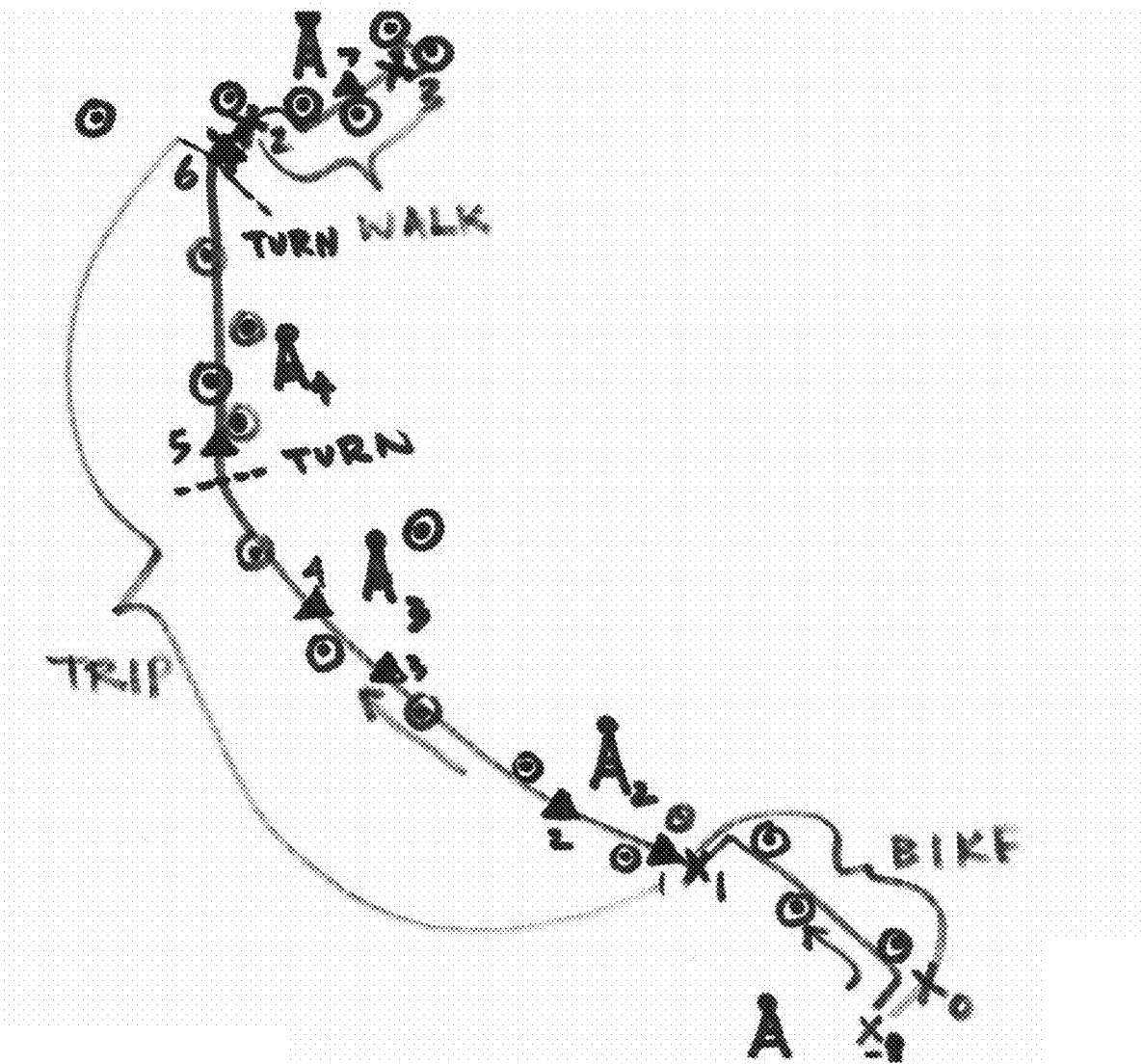
FIG. 6A is a diagram illustrating an example trip.

Referring to FIG. 6A, an example is shown of a trip made while carrying the mobile electronic device running the persistent location app. The trip begins at a home location $X_1$ and includes a biking and walking to the train segment (from location $X_0$ to $X_1$), a train segment (from location $X_1$ to $X_2$) and a walking segment from the train station to the point of sale (from location $X_2$ to $X_3$). During the train segment, periodic stops may occur. The trip ends at a point of sale at $X_3$. Along the way are located various reference points, including Network fix reference points (represented as dotted circles) and cellular reference points (represented as towers). GPS is used to obtain infrequent location fixes (represented as triangles).

FIG. 6B through 6N, FIG. 6P and FIG. 6Q are diagrams illustrating aspects of operation of mobile electronic device during the trip of FIG. 6A.

Figure 6B:
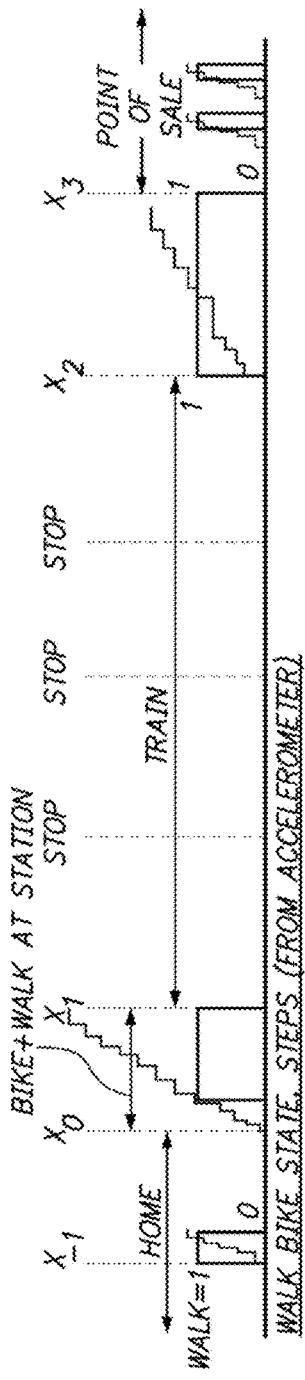
FIG. 6B through 6N, FIG. 6P and FIG. 6Q are diagrams illustrating aspects of operation of mobile electronic device during the trip of FIG. 6A.

Referring to FIG. 6B, transitions to and from a walking state and the accumulation of steps, based on accelerometer readings, are shown. For purposes of FIG. 6B, walking and biking are considered the same state, and the pumping motions of bike riding are considered the same as steps. Biking and walking can be differentiated in most cases as the step periods, amplitudes, and start and ending periods are different. Biking tends to have lower amplitude, longer periods, punctuated by coasting periods. Walking tends to have higher amplitudes, which impacts all 3 axes. Biking motion is smoother and impacts fewer axes. From home, steps are taken to get to a bike. The stair-step line represents the accumulating step count. Riding of the bike begins, and "steps" are detected and counted as the bike is pedaled. During the train portion of the trip, no steps are detected. Later, during the last portion of the trip, steps are detected during walking from the train station to a point of sale. At the point of sale, walking and no-walking are interspersed.

Figure 6C:
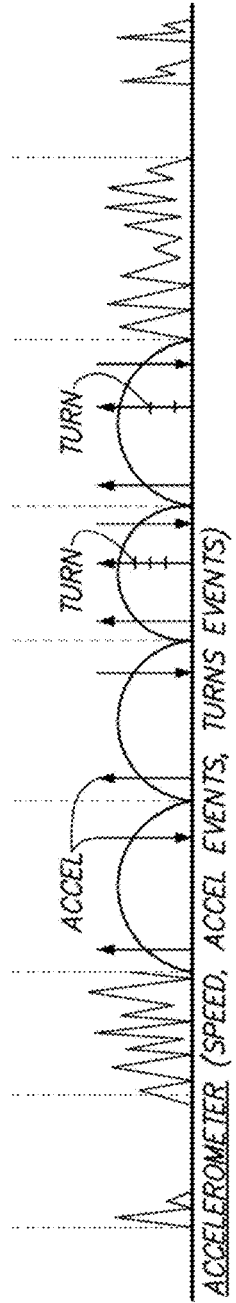

Referring to FIG. 6C, a first view of accelerometer activity is shown. During walking and bike riding, accelerometer readings are irregular. During the train ride, accelerometer changes are generally smaller and consistent with the train motion and can be used to estimate a smoother jerk, acceleration, and velocity profile that can produce a range traveled. The range integration is also punctuated by stops or turns, turns being marked by changes in the ratios of the 3-axes of the accelerometer using only the accelerometer. Thus, turning can be identified with the accelerometer without requiring the higher power gyroscope. Further details of how turn detection may be accomplished are set forth in Appendix A.

Figure 6D:
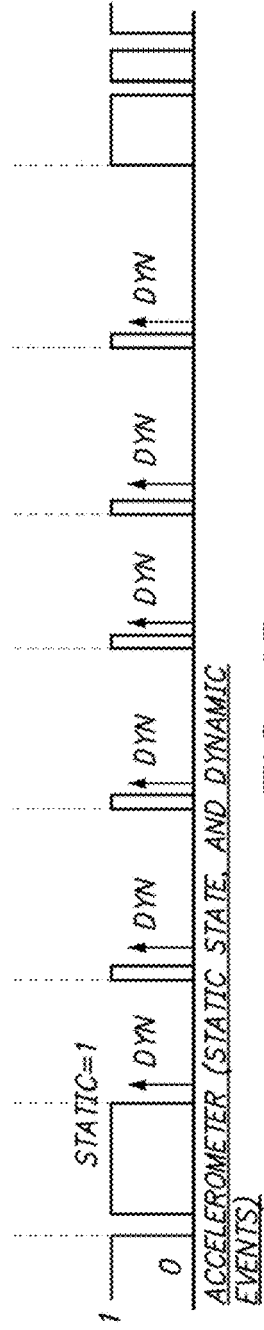

Referring to FIG. 6D, another view of accelerometer activity is shown, showing transitions between a static state and a dynamic state. During a dynamic state, marked by irregular accelerometer readings, the accelerometer may be sampled more frequently. During a long static state, also referred to as table mode, marked by accelerometer readings that are generally constant within a range, the accelerometer may be sampled less frequently.

Figure 6E:
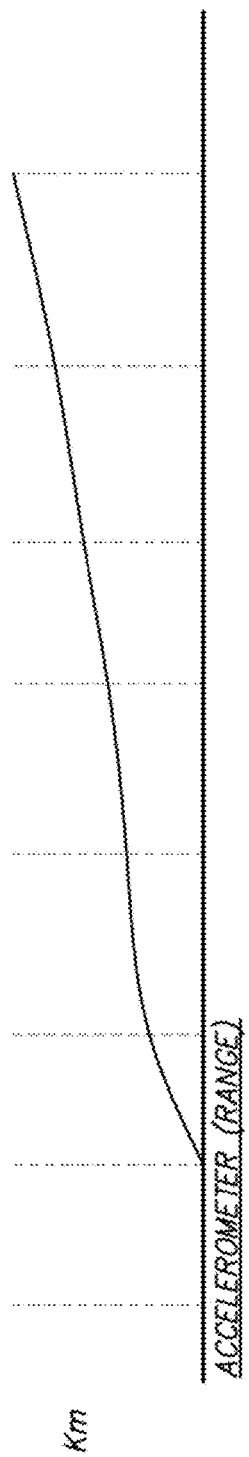
Figure 6F:
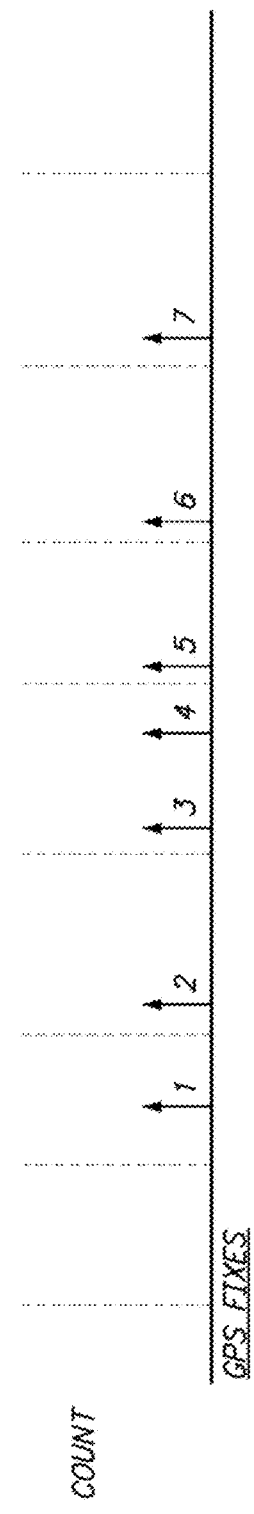
Figure 6G:
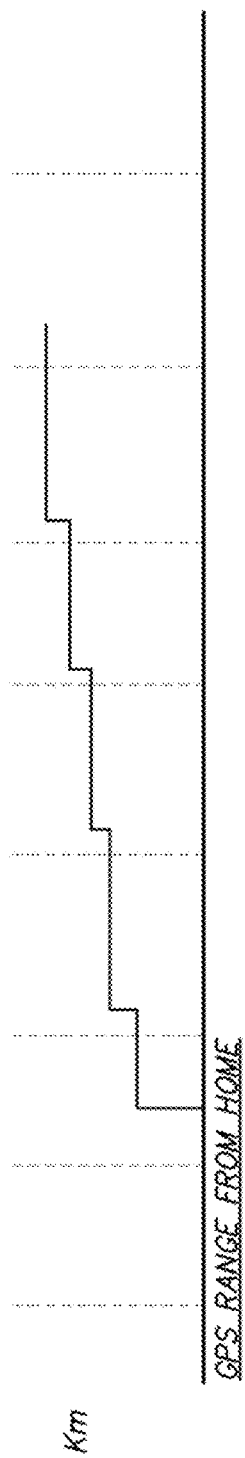

Referring to FIG. 6E, another view of accelerometer activity is shown. Range (distance traveled) is computed from accelerometer-derived readings and increases rapidly at different rates depending on whether the user is walking, biking, driving, etc. These ranges are ignored as being unreliable. Walking and biking have extreme acceleration and velocity estimates and are too noisy to estimate reliable range. Conversely, driving and train motion without steps or hand movement yield stable acceleration and speed estimates that can be integrated to infer range traveled.

Figure 6H:
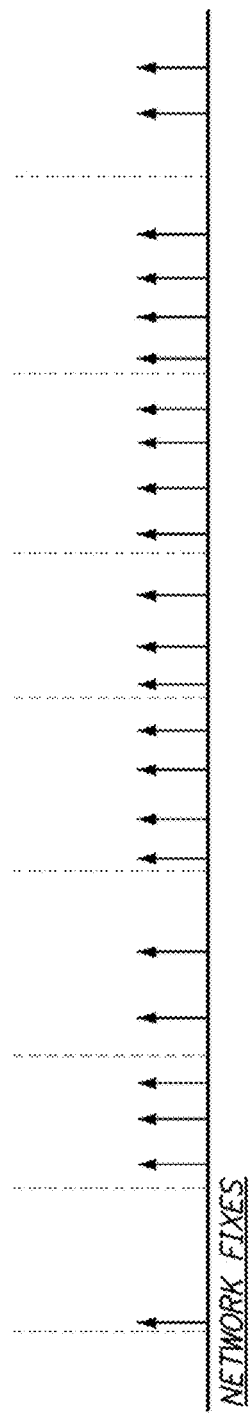
Figure 6I:
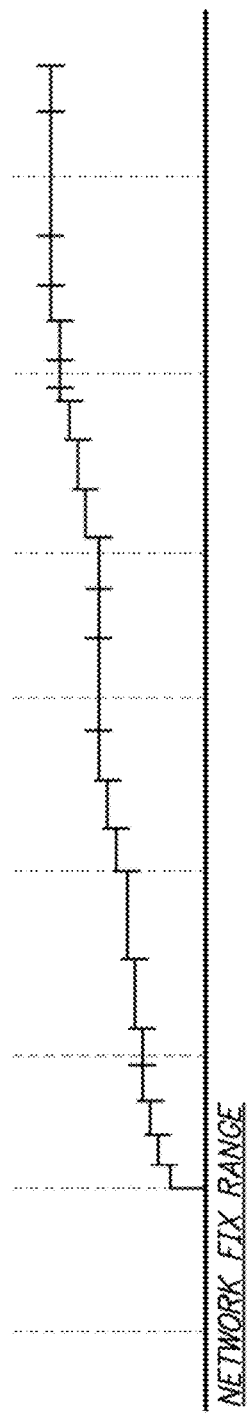
Figure 6J:
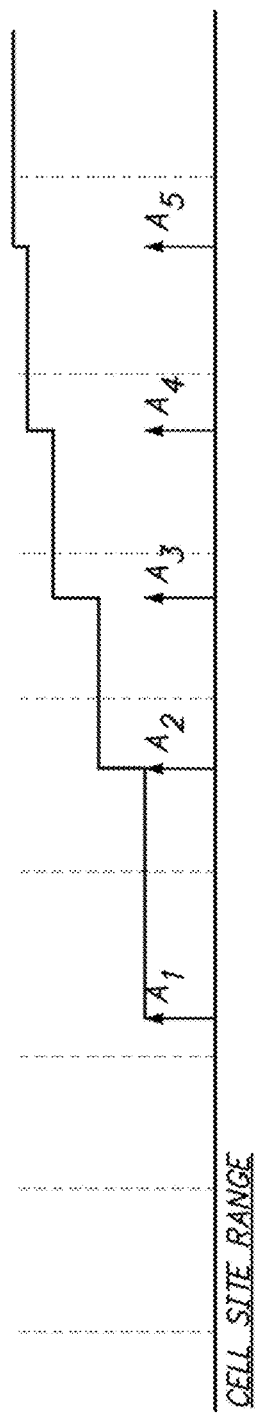

FIG. 6F to FIG. 6I illustrate fixes and range from home (starting point) based on GPS fixes (FIG. 6F and FIG. 6G) and network fixes (FIG. 6H and FIG. 6I). FIG. 6J illustrates range from home based on cell site proximity. As the user travels from cell to cell, a step increase in range is recorded based on the assumption that the cell sites have at least a minimum spacing. Cell range traveled here is independent of knowing the locations of the cells, although this is possible in case the cells have been observed before and an average location was determined based on GPS or network fixes that were close in time to observing the cell position. Even though the cell range is coarse, it still provides another independent movement indicator and can be used to identify movement that is inconsistent.

Figure 6K:
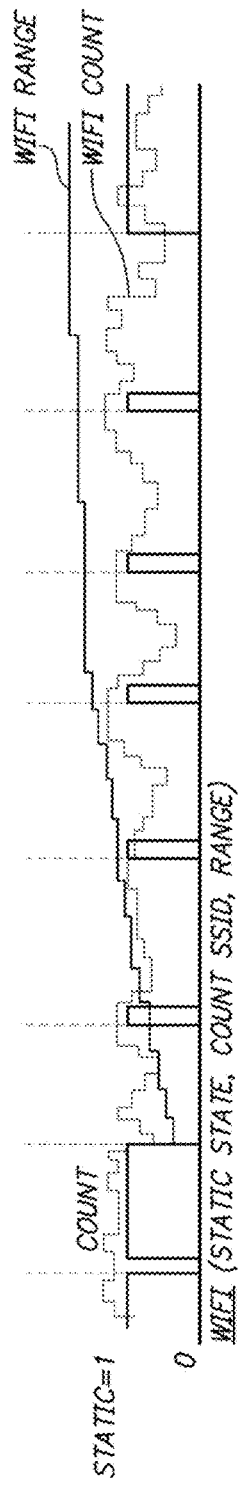
Figure 6L:
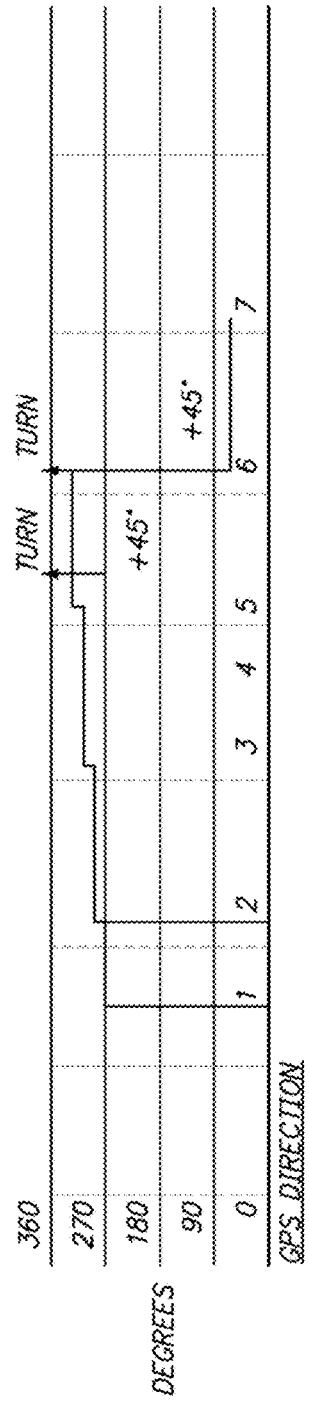

Referring to FIG. 6K, a view of WiFi activity is shown. WiFi scan results may be used in making a determination of static or dynamic status. A count of the number of accessible WiFi access points is kept, as indicated by the stair-step line. Also, range is computed based on WiFi scan results. Range may be computed multiple ways to indicate a velocity which can integrated to produce range. One method of velocity uses RSSI (received signal strength indicator) when the station is observed repeatedly. On the first observation, the time and RSSI are saved. If the AP is observed again, a range change can be computed. A table is stored in non volatile memory that has the range from the transmitter according to RSSI. The two RSSI measurements produce a change in range according the two range estimates from the two RSSI measurements. A speed estimate is produced by dividing the range change by the time between measurements. The speed estimates from all repeating APs is averaged and weighted according the average RSSI strength. While quite approximate, the speed estimate has good properties: when one is strong and one is weak, it is clear that there has been movement away or towards the transmitter and the speed will be high in magnitude depending on the time interval. If both RSSI measurements are strong or both weak, then the range change will be small and yield a small speed estimate. If the AP is not repeating and has not been seen recently, then it can be assumed that the phone is moving and a rough speed higher than walking speed can be derived from the single AP measurement. While the speed estimate is not accurate, it is likely that there has been movement. Thus, the WIFI scan can also provide movement information that can be pooled with the other sensors to validate the GPS. Yet another method of speed estimation based on WiFi reference point locations that have been learned previously or known on the server is to simply take the difference in position divided by the time between occupation of a WiFi AP. The speeds from all APs are grouped together to produce a speed estimate which is integrated to indicate distance traveled Referring to FIG. 6L, GPS fixes, obtained periodically, include a GPS indication of direction. The direction can be from the heading obtained from the GPS velocity vector well above a noise threshold or from vectors of consecutive GPS locations that are further apart than the estimated error circles around the two locations. For example, if the two fixes are 1 km apart and the two error circles summed together are 100 m, then the ration of 1000/100=10 indicates the direction is valid. Conversely, if the sum of the range change is less than the sum of the error circles, the heading is not trusted. This direction information may be tracked. Correlation is seen of changes in GPS direction with turns during the course of the trip of FIG. 6A.

Figure 6M:
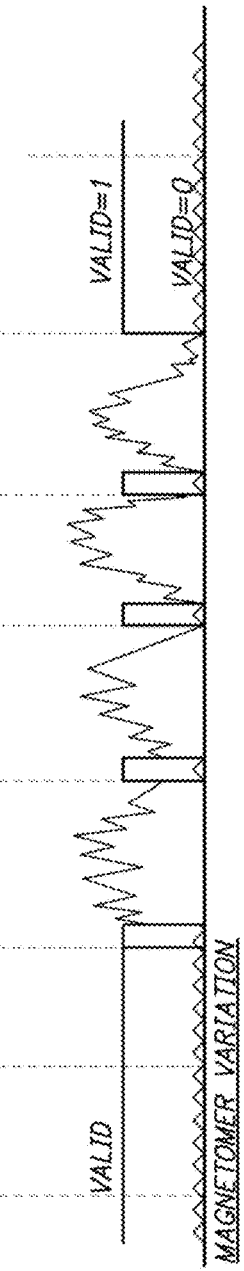

Referring to FIG. 6M, magnetometer variation is shown. During the train ride, magnetometer readings are unpredictable and erratic. Hence, during these periods, the magnetometer input is flagged as being so erratic as to indicate being on a train, as the high iron content impacts the magnetometer uniquely. Before the train ride, and during stops, the magnetometer input is flagged as being valid and can provide direction of travel assuming the offset between the phone reference frame and the navigation reference frame can be estimated. In one embodiment, the offset can be ignored and the shape of the trajectories can be compared. In another embodiment, the offset can be factored away by rotating the magnetometer based trajectory until it agrees with the GPS trajectory. If such good agreement is found, the GPS trust is increased. If no such agreement can be found, the magnetometer data will be rejected in case there was significant hand movement, meaning the offset was not constant. If however the hand movement was low, then the magnetometer based trajectory is not removed and will vote in the validation.

Figure 6N:
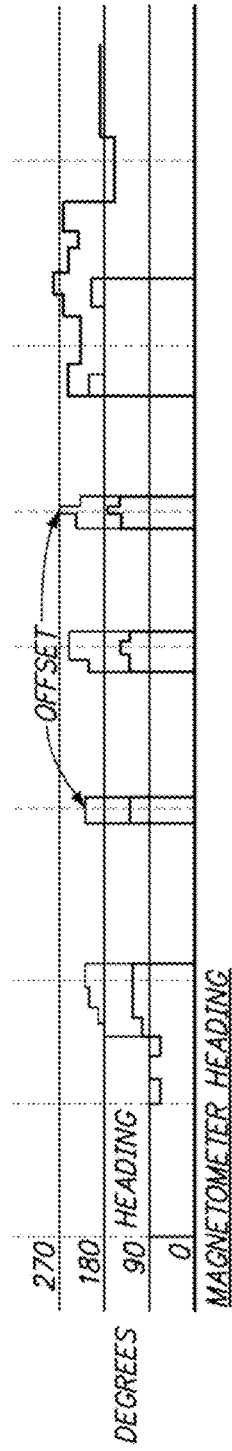

Referring to FIG. 6N, the magnetometer input, so long as it is valid, may be used to track heading. In one embodiment, the direction is determined from the change in positions. Then the offset between the phone reference frame and the navigation frame is estimated as the difference in the direction from GPS and magnetometer.

Figure 6P:
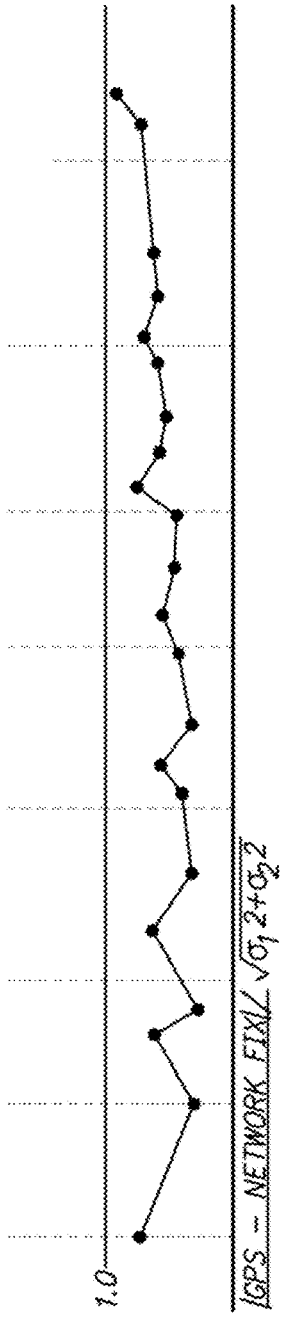

Referring to FIG. 6P, a measure is tracked of the variance of the differences between GPS and network fixes. So long as this variance is within a certain bound, the location information from the different sources is regarded as consist. If the variance is outside those bounds, then the location information may be flagged as suspect.

Figure 6Q:
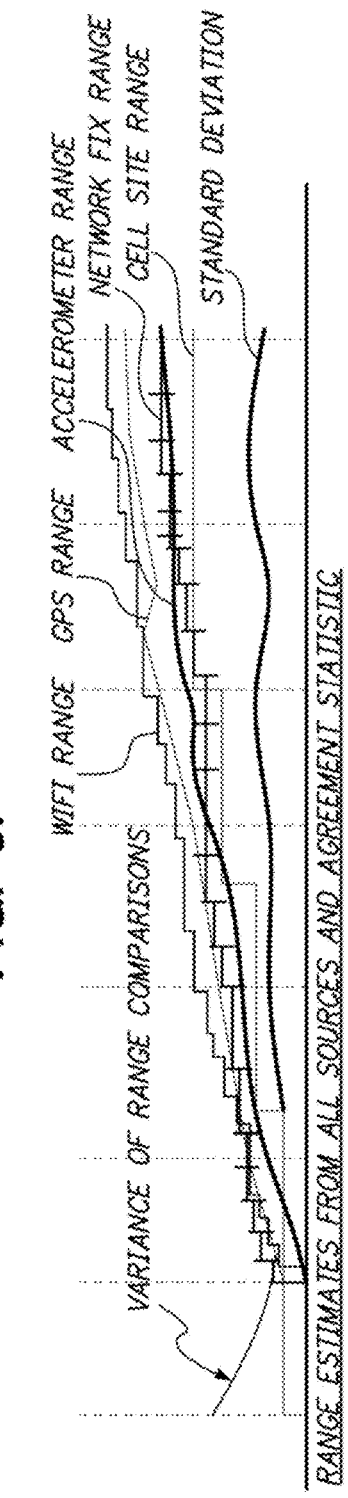

A similar comparison may be performed with respect to range calculations from different sources, as shown in FIG. 6Q. Those range calculations may include WiFi range, smoothed GPS range, accelerometer range, and cell-site range, for example. The standard deviations of these different measures may be computed. If that deviation is within certain bounds, the range information from the different sources is regarded as consistent. If the deviation is outside those bounds, then the range information may be flagged as suspect. Similarly, the times of motion can be determined from the accelerometer, that is, the times when motion is occurring and when the phone is static. These can be compared to the changes in position from the GPS. If the GPS movement occurs when the phone indicates there is no motion, then the GPS fixes are flagged as suspect.

From the foregoing description, it will be appreciated that the information gathered and reported contains redundant observations. Accordingly, cross-checking may be performed for purposes of verification. For example, location information from different beacon sensors may be inconsistent, possibly indicating an attempt to "spoof" the system. Location information may be inconsistent with movement information, likewise indicating an irregularity.

To minimize spoofing, the reference point locations can be either determined on the server where a large data base from multiple users can reject outliers or spoofers, or on the phone by observing that that locations used in the average are all within an expected range over a significant enough time. For example, the residuals can be analyzed and the largest residual can be saved as an indicator of the stability of the sources used to form the average. If the number of contributing locations is enough, the time duration over which the points are collected is enough, and the maximum residual is within the expected reception range of the beacon type reference point, then the likelihood of spoofing is low, and the reference position can be trusted. For example, for a WiFi AP, the expected range is 200 meters. So a spoofed GPS location at 5 km from the truth would capture the largest residual and indicate that the reference point is not valid. A background task can later cleanse this reference point after reporting the event to the server by resetting the location average for the reference point. Other methods for spoofing determination can be implemented on the local data base on the phone.

Figures 7, 8:
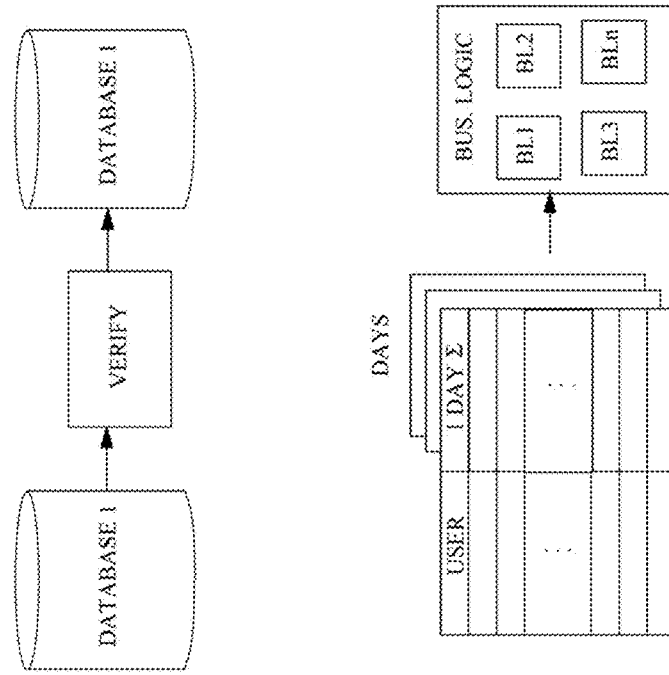
FIG. 7 is a diagram illustrating data validation.
FIG. 8 is a diagram illustrating aspects of server processing.

Referring to FIG. 7, to ensure data accuracy, in one embodiment, data is first stored in a first database. Cross-checking is then performed on the data. Such portions of the data as are determined to be consistent are then stored in a second database. The data in the second database is accurate with a high degree of confidence and may be used for various applications in which accuracy is a requirement or a high priority.

It should be noted that there is a major advantage of processing data on the phone over simply recording all observations and uploading them to the server. Determination of the modes such as table mode, static, driving, walking can be used to control the collection of location data and the frequency with which data is requested and stored. For example, in table mode, the requesting of WiFi scans is greatly reduced, such as to once per five minutes. If walking mode is detected, then the location can be requested every 200 steps for example so that the distance traveled from steps can be cross checked against an absolution location sensor such as GPS or network fixes. If the receiver is determined to be indoors, GPS is never requested and only network locations are requested. If the mode is driving, then the locations are requested at the rate according to integration of a minimum range such that map matching can work effectively. Without such information, location would have to be requested at a regular interval to be sure to capture a good trajectory. Similarly, the driving mode should be used to enable the fine estimation of acceleration and jerk using the smoothed jerk estimator. This method is superior to the simple high frequency difference where the road noise cannot be isolated from the vehicle motion. Otherwise, all the acceleration and sensor data would be required to be sent to the server at all times, which requires large storage, large transmission burden, and large server processing burden, which would increase server costs. By processing on the phone, the driving profile can be compressed into only start and end events, acceleration events and jerk events that are above a threshold determined by the consumer of the UBI data.

Driving mode is determined by a large period where the consecutive acceleration differences are within a range above static mode and below a level that would be common for walking, or hand movement. Thus, observation of steps are critical to preventing starting drive mode, and useful in ending a drive trip when the phone user exits the vehicle. Arrival at home bases such as work or home can be used to end drive mode and trips.

The tuning of step detection is also a factor in setting up drive mode. In some cases, bumps in the road, or oscillation of the car due to suspension effects, can cause small cycles or steps to be detected. Thus, the drive mode step logic should be tuned so that these continuous small cycles do not delay detection of driving mode.

Similarly, sometimes a phone in the pocket of a person standing and not walking can produce acceleration difference that look like driving; that is, the delta is above the minimum threshold and below an upper threshold for a significant time. To prevent false driving mode detection, many measures may be employed. Observation of static mode from WiFi can be used to distinguish the standing data from driving. Similarly, long slow periods of human motion such as slowing moving the weight from leg to leg can be detected to prevent starting drive mode. Similarly, bumps on the road should be ignored and not called steps that could falsely end drive mode. A second not-driving WiFi flag may be produced independent of the WiFi speed estimate. For example, walking in a store can produce speed estimates that indicate movement. However, in a store where people often stop and stand and might yield a false driving estimate, the repeating observation of APs can indicate that the phone is a fixed location and likely not driving. Of course this must be tuned so that a long stop in front of a store is not confused. One way to do this is to count how long the APs are observed without being lost, or the number of APs (a good indoor indicator for a store like Safeway where there are often 40 APs saying Safeway or are blank, indicating a common location).

False driving determination is not fatal. The only penalty is an incrementally higher calculation and event storage and possibly higher location request. Typically the false driving will be quickly canceled with walking detection. Finally, the location data itself can be used to either start or cancel driving. For example if the likely locations from WiFi network fixes inside a store yield a small position change, or there is an indication of being indoors, the false driving mode sessions can be cancelled. Similarly, the app can listen for location data that is being requested by other apps or by the OS's own travel logic. If the current app missed declaring driving mode, but the location changes from "listening only or non requested fixes" indicates a large movement, then drive mode can be enabled. Finally, the server can analyze the data on a daily basis. It will identify locations that are maintained for a long time as static anchors with a start time and end time. Then these anchors are joined together, where one anchor's end time is connected to the next anchor's start time. Based on the accelerometer based context, that is, either steps to indicate biking or walking, or a narrow range of readings that indicate vehicular travel, and based on the time interval between the end and start, a likely travel means can be inferred. Thus, movement can analyzed more effectively well after the actual travel time using the complete day's movement well-anchored by home bases where the phone is static. These home bases are also validated with absolute locations from GPS and OS Network fixes, repeated beacon sensor such as WiFi APs, Bluetooth MAC addresses, etc.

Detection of driving mode is also similar to detection of a driver and specific vehicle. One method is to detect a beacon that is permanently installed in the vehicle such as a Bluetooth hands free capability beacon. The MAC address will be specific to the vehicle and thus, can be used to identify a specific insured vehicle. Whereas other means such as a microphone can be used to identify a specific vehicle characteristic and unique sound, this technique might be considered obtrusive to the user. Another method is to use the acceleration difference signature of a driver and a vehicle, referred to as the ACCEL_DIFF_HISTO. The 3D magnitude differences are binned, with smaller bin sizes in the lower range, such as 16 bins between 0 and 1 $m/s^2$, then 16 bins between 1 $m/s^2$ and 4 $m/s^2$, and 16 further bins between 4 $m/s^2$ and 20 $m/s^2$. The histograms are populated continuously and are evaluated periodically. Suspension characteristics around 1 Hz will appear the 1 $m/s^2$ range. High acceleration and braking will also appear above 1 $m/s^2$. The lower bins between 0 and 1 $m/s^2$ will be populated by road noise and also the high frequency characteristics of the vehicle. These data are sent to the server for long term analysis and then driving segments can be verified as being the regular vehicle and driver. Such histogram analysis can also be used to identify a road segment with bumps or the surface type. Such data is useful to municipalities to identify roads that need resurfacing.

Another method of detection of the driver and vehicle can be in a repeated orientation of the phone while driving. Many people put the phone in the same location, such as a cup holder, in a phone mount, or in a tray in the vehicle. For this reason, an additional histogram is included in the ACCEL_DIFF_HISTO message that describes the frequency of occurrence of the pitch and roll of the phone. Typically the pitch is zero when the phone is flat on the table, −90 when the top of the phone display is rotated upward for viewing parallel to the face, and 90 when turned top is rotated down. The roll is zero when the phone is flat on the table, is 90 degrees when the left part of the screen is rotated right, and −90 when rotated left. The pitch also transitions to −180 or 180 when the phone display pitch transitions from −90 and then continues to rotate the top towards the floor. In this way, all quadrants for the phone orientation have a unique pitch roll value. In case the phone is placed in the cup holder and is visible, the pitch might be −65 degrees and the roll +/− a few degrees. This pitch and roll combination might show up as the most common value when the user places it in the car. Also, it unlikely that the phone would have the same orientation in a different car as the person would not be likely to put the phone in the cup holder when they are not driving. Another case is that the phone is the pocket. This combination is less unique to identifying the driver/vehicle combination. However, the driver and vehicle delta acceleration histogram (ACCEL_DIFF_HISTO) will still capture mainly the underlying vehicle and driver dynamic characteristic, even in the pocket, as the slow rate body motion would be low frequency.

Identification of driving characterization such as turning and straight accelerating (and decelerating) is described in Appendix A.

In the lowest power operation, it should be noted that some data might be missed at the start of a drive prior to the detection of drive mode. This penalty is accepted in the case that the phone is not externally powered. Detection of external power can change what data is calculated and stored. It is acceptable that the phone method of driver characterization does not have the 100% driving coverage possible with an in-car telematics device. However, the tradeoff is that the smartphone solution has the lowest cost to the phone owner and insurance company and still provides good driving characterization of distance traveled and driving style. The phone is superior in that it can identify the driver, and also how the driver uses the phone while driving, which is a major contributor to accidents when used inappropriately. A high hand holding event count while driving can be detected in large changes in the phone attitude, meaning the pitch is changing moving from a flat to a vertical orientation. Phone holding next to the head can also be detected with a proximity sensor. These events are naturally low frequency and recorded in the raw file.

A key part of low power location awareness is enabled with the self-built or downloaded reference point file. As long as the average deviation is similar to the expected range of the beacon sensor associated to the reference point (meaning the point has been verified and not spoofed), then the later observation of that reference point means that the reference point can be used as an estimate of the location while that reference point is being observed. This saves power as it means location does need to be requested. Furthermore, it means that a private location can be maintained; that is a position is known and can be shared with other parties where it is possible that the phone is not requesting location, in which case the OS may not have an up-to-date location.

To maintain a low indexing search time for the reference point, optimizations may be used. First, once a reference point index has been found in the table, it should be saved in a smaller current table so that the time to search the index is reduced. For example, suppose the latest 50 WiFi APs are stored in the current WiFi table. When the phone loiters around this location, such as a home base, then the search time is greatly reduced to this small table. Secondly, the table should be organized either in a latitude/longitude grid, or around home bases, so that each new WiFi that is not in the current list does not require searching the complete table size. Such a search, while as simple as comparing the current WiFi MAC address to the MAC addresses in the table, can be thousands of indices each time, depending on the size of the table. Such a search for new points can thus put a large calculation burden on the phone CPU and may end up using more power than doing a location fix. One option is to periodically cleanse the table of rarely used points which allows reducing the table size. This can be done every few days when the phone is charging. Another option is to share the self-built tables with the server, which then merges with other tables, and then returns a set of smaller optimized tables that are organized by location. After the local table has been searched, there is no need to search further. The unfound point is then added to the self built table as well as the current table so that the next scan can use the already found index.

One manner in which data may be processed for various applications is illustrated in FIG. 8. For each user each day, a daily summary file is produced summarizing movements and other relevant information for that user. For example, the driving distance time of day, and major occupation location, such as work, home, shopping can be established. The daily summary files are accumulated. Subject to user approval, the accumulated daily summary files, or some portion of them, are then made available to one more business logic modules. However, a preferred embodiment is that data itself is not shared. Rather, the business logic allows a marketer to pose a question to the data base. The business logic modules process the daily summary files to extract relevant information (driving habits, activity level, places frequented, etc.) and then returns a result that answers the question without providing all the raw data itself. For example, the marketer may be interested in whether the person shops at large shopping malls or at smaller family owned businesses. The answer would be a score, say 75% large mall, but 25% family owned. But the result would not contain the locations, or times. However, if the marketer was willing to provide a better discount for knowing which stores, the data owner might be interested in sharing which stores, but not the times of day. In another application, a dating service might be interested in knowing how close two candidates might come to meeting in their normal routines. The score might return an average distance apart for one price. For a higher price, the score might return a particular establishment that both parties have in common. But the score would not contain the times unless both parties consented to that. The business logic modules may be proprietary to a single service provider. Alternatively, the business modules may be proprietary to different vendors and may be hosted by the service provider in such a way that details of the business modules remain secret and proprietary.

Elements of a Smart Phone Based Algorithm for Determining and Sharing Car or Vehicle Driving For Vehicular UBI, a smart phone can be used to provide data that is representative of the driving characteristics such as time of data, miles drive, style of driving, how the phone is used during driving, the number of passengers, etc. In same case, the data such as miles driven might not contain all the driving miles as a captive in-vehicle solution might in case the phone was forgotten or switched off. While it may suffer in some areas, the smart phone solution can provide other data that the installed system cannot. The phone based system here has the following characteristics:

1. It is persistent, which means always started when the phone is started so the driver doesn't have to start the app for each drive.
2. It is low power, deriving location using reference points in usual driving areas, and minimal use of GPS or Network fixes that require high calculation or cellular mode use for the points in the new drives and before these driving areas can transition to usual areas.
3. Determining miles driven by detection of driving mode and using a minimal number of location points that are map-snapped with map matching.
4. Detecting hand movement to identify phone use style and remove those dynamics for the dynamic data set.
5. Using a smoothed detector for estimating driving dynamics that does not require leveling (that is stopped periods to estimate the accelerometer offset due to the gravity vector). The accelerometer measurements are differenced across 1-2 seconds; these slopes are averaged and integrated to determine an average acceleration to be used to characterize braking and acceleration of the vehicle.
6. Using the acceleration estimates ratios to determine the phone heading offset and determine if the vehicle is turning or accelerating straight so as to characterize driving without requiring the higher power gyroscope of GPS to identify turns and straight roads.
7. Also using these turn estimates to aid the map matching to target when turns to different roads are made.
8. Integrating the average acceleration estimate to produce a speed estimate. Integrating the speed estimate to produce a distance traveled and requesting a new location when the distance traveled exceeds 1000 meters or when it is determined that a turn has been made from the accelerometer delta heading from a histogram of forward heading.
9. Using the observation of reference points with a confident location estimate to clear the distance traveled indicator so that the phone does not need to request a location from the OS, thereby reducing power consumption and keeping the location as private as possible.
10. Identifying static and dynamic segments using the accelerometer only so as to identify acceleration to brake and acceleration to leave stopped mode.
11. Using a histogram of the consecutive accelerometer measurement difference magnitude to save all dynamics in a compressed format that is stored periodically.
12. Using the histogram data to identify the car/driver combination, as even the same car will be different by different drivers.
13. Using other inferences about the home base and work location or frequented places to identify car/driver combinations.
14. Using a beacon ID (such as a BlueTooth hands free device installed in the car) in the car to identify a particular car so driving for a phone can be assigned to the insured car.
15. Using the calculated phone attitude (pitch, roll) to identify a car/driver combination when the user puts the phone in a cup holder or repeated place to identify a car/driver combination. People do not usually put their phone in a cup holder in a taxi or another person's car.
16. Identifying segments according to where the user started from home base (to reject the points of jumping in a cab) and using the discontinuity to reject non-insured car segments.
17. Always letting the customer interact with which data is shared and at what value they place on certain data. For example, a user can pick a 3 month window of their discretion to share with multiple insurance companies. They user can also set a value on different data, such as commuting data, phone use while driving, and choose whether to share it or not, or at what price.
18. Using the accelerometer to identify cycles. Determining if these cycles are due to moving the phone with the hand, or due to bumps in the road. This is done by analyzing the magnitude of change between the max and min peaks around the center range of the accelerometer value, which is high for walking, and also by analyzing the repeatability of the time interval between each max to max peak and min to min peak. Bumps in the road will be random. Walking has a repeated strong interval. Differencing the time intervals produces the repeatability factor.
19. Using the accelerometer to identify walking to demark entering and exiting from the car to frame the driving time.
20. When not in driving mode, using the steps estimator to estimate a distance traveled walking and request a fix from the OS when the number of strong steps is above 100. However, if a reference point is encountered with a confident location, then the reference point can be used as the location rather than one requested through the OS. Thus a private walking trajectory can be made.
21. Because redundant location information is stored, such as location from GPS, network fixes, reference points, cell ID location, and because the traveled distance and stopping times can be cross checked with the accelerometer and magnetometer, the data is cross checked and validated against spoofing. Thus, the validated location has a higher value and can be used in applications where this is important, such as tracking employees on their delivery routes, salespeople visiting customers, etc. This capability will be valued by enterprises. For example, a distance traveled driving can be computed for a salesforce application where the salesperson can have a pre-made spreadsheet of sites visited, times, and frequency, along with a distance traveled for fuel and personal car re-imbursement.
22. As the app is persistent, its saves other activities such as walking level, amount standing (determined from the accelerometer and attitude as well as slow attitude changes due to body shifting), nervousness levels determined by the vibration levels observed in the accelerometer histogram for sharing data for life insurance UBI, etc.
23. Data is stored, enabling honesty games. While two people are together, a question is posed to each player about a point from the past or a location not in their past. The question can ask when the point was visited and coming from where or going to where. Based upon the answer chosen from a list, a determination is made whether the person has a good memory or whether they are honest or not. A score is determined and the two players compete.
24. Using the data base to determine what common places or activities the two parties have in common, whether at the same time or not. In this regard, the reference location data base is advantageous in enabling a private location data source. The reference location data base is created with frequent occupation nearby a beacon ID, such as a wife access point (AP). In the initial phases, the AP ID information is saved in a data base and the initial first observation time is stored. In a lowest power mode, the location is not requested unless it is the strong current AP or if the app is configured to build the average location quickly. The location is initialized when a location can be determined in close time proximity from observing the AP to getting the location, or a longer time if the phone is static. Subsequent re-occupation will update the latest time observed, and the histrogram of when the point is occupied, according to which hour of which data of the week (Sunday to Saturday) (7*24 cells). Periodically, the position is requested to update the position average of the reference point. It is updated if it is the strongest and it has been a minimum time since the last observation, such as a day. It is updated until enough points are observed. The position difference from the average to the new location is maintained to verify that the average has the expected standard deviation. For example, a WiFi AP has a range of 100 meters. Thus, all the locations should be within +/100 meters to be valid. A location of 1 km or more from the current average should not be used. For example, if a person was spoofing their location to declare they were somewhere incorrect, then the large location difference would be seen in the reference average location calculation. The AP would be declared as spoofed. It cannot be known whether the initial or later fixes were the spoofed ones without considering the other APs in the data based. The data base can be searched for APs that were seen at the same time. If the time difference is small, then the position difference is computed and a velocity is estimated as the position difference divided by the time difference. If the velocity is too big and one AP never saw a large position difference in the construction of its average location, then it means the other point is inconsistent and possibly spoofed.

25. After the reference point is determined to be not spoofed, because all the contributing locations have a small difference, and nearby APs were visited at a similar time and their location average is also consistent, then the reference point can be used as a location estimate. This estimate is private because it was computed only on the observation of reference points and using the location from previous averaging. In this way, the user can send his location to an in-group member via app to app communication and the OS will never be aware of this location. As a result other apps would not have access to this location. In this way, the user can build his own private location history because there is no need to request location from the OS. Such a request will cause location to be computed and it would then be available to all other apps that are listening to the available locations. In this way, the user can maintain counters of which fixes that were requested, such as those needed to build the reference point locations, and also which fixes were available by listening to the all the locations computed by the OS. In case no other apps were running, then the user could have a private location system as it can determine its location using only the reference points and the learned location average and not need to request from the OS as long as there were enough reference points. In this way, a family can know in-group member's locations without needing to request location from the OS, which would then make the location available to all other listening apps. Also, the persistent app here provides a count of all fixes on the phone. It can provide private location by disabling the other apps, and only running the private location app. Subsequently, it can offer this private location information to $3^{rd}$ parties at a premium price because other parties would not be able to access location for this user.

26. Now that data such as driving information is compiled (such as start and end times, driving styles, driving distances), the data is retained on a server controlled by the driver and data owner. The driver has access to the data and can see all the drive information. The driver can delete data if desired, although it is recorded that data was deleted. The driver can then select a portion of the data as being a block of data that is exemplary of their driving. This data can then be flagged as available. The application on the phone is then asked to search for insurance companies. The data is presented to the company and a quote is requested from the company. The driver can look at the quotes from various companies and choose the company with the best quote.

27. Similarly, other characteristics can be computed from the data, and this analytical data is presented to driver, that is the phone owner, and shown in numerical, textual, and graphical format. Examples of such information may be that this person drives rarely, typically commutes to work by train, or bus, typically stays home, walks a certain amount, holds the phone a certain amount implying talks a lot on the phone or plays games, shops in stores frequently, goes out frequently at time, is a "home body" or a "party boy". The user can choose to delete the data, or to allow the data to be used on various social media to provide informative data. The data is considered honest as the user can only delete data, but not change the data, and it is also verified with multiple sensors.

Procedure of Building the Reference Point Library or Data Base.

1. Observe the reference point the first time. Determine it is new and add this to the data base as a new point along with the first observation time.
2. Update the histogram of when this point was observed by hour and day of week. (7*24 bins).
3. Listen for location or request a location from the OS if this is the strongest reference point and it has not been observed for a minimum time such as one day. In this way, the average position is built slowly, and also accurately as the locations should be near to the transmitter if they are the strongest.
4. When processing the location, compute the residual between the last average location and the new location. Compare the residual to the expected range of the transmitter and the accuracy of the location (the position sigma from the fix). If the position difference is less than the root sum of squares of the new position fix sigma and expected range, then update the average with this location and update the average sigma as the standard deviation of all fixes participating in the average. Produce a confidence factor as the largest difference between a new fix and the average location. Declare a point spoofed when the difference is 10 times the expected difference. Declare a point spoofed if the APS collected at a similar time have locations that are too far away from the AP being processed such that car could not travel between the calculated distance between those points in the time between observation.
5. Declare that the reference point average location is finished when the number of points is sufficient and the observed standard deviation is small and below the range of the transmitter. At this point the reference point is usable for navigation.
6. If the reference point ID is observed and it is usable for navigation, then use this point and disable any driving range or walking range trigger that may have induced the need for requesting a fix from the OS. This allows maintenance of a private location source that can be shared with in-group members or marketers for a higher price than locations available to all apps via the OS.

Example: Building a Sample Reference Point Histogram for a Wifi Access Point

Referring to the table below, the top line is the row number (row (0)), then the index number (720), the MAC address of the wireless router (2381705590002800), the BSSID (safewaywifi), the average latitude (39221895), longitude (128046296), in integer format with least significant bit scale factor of 2^20 (means divide by 2^20 to get radians), altitude (172) with least significant bit scale factor of 2^6 (means divide by 2^6 to get meters above sea level), the standard deviation of all points contributing to the average location (16 meters), the number of locations points in the average (70) [a max of 100 which changes to the largest update residual in case of a large residual as described below], the average RSSI seen (−88 dbm) and the number of times seen (307). The first date seen is represented in the row (1), in this case May 4, 2014 on the day Sunday (day 0 of week) at 5:18:52.052 PM in the afternoon (17,50,18,52). The latest time seen is on row (2), in this instance May 24, 2014 on Saturday (day 6 of week) at 7:57:42.563 (19,57, 43,563). There are 11+8 total observations in hours 17 and 18 of day 0 (in row (3,0) [where 3 is the histogram section and 0 is the day in week], and 27+261 observations in hours 18 and 19 on Saturday (day 6 of week) in row (3,6). The final two rows (4,5) give the last time a GPS and network fix were applied to the reference point location and the magnitude of the distance between the fix and the reference point location prior to updating the location. In case there was any spoofing of the data, the number of fix value, which is also referred to as the state (value 70 here) would be modified to include the largest residual between the new GPS or network fixes and the reference location. For example, if a position was spoofed at a time when the reference point was visible, but say 30 km, then the state would change from the counter value to the residual value. This would indicate that the reference point is invalid and also that there is the potential for spoofing, and that the user's location is not validated or verified. The last GPS and network fix position updates are useful for knowing how long the reference point location has been stable or active. The time in row 2 indicates the last time the reference point was seen, but not whether the reference location was updated. For example, a reference point that has not been updated for a long time and that has not been flagged as suspicious in terms of similar update times with other reference points that have very large distances between reference points, would be considered confident and not likely spoofed. A new reference point without adjacent reference points would be lower confidence as it would not be connected in time or location, and thus, could not be verified as well.

0,720,238170559002800,safewaywifi,39221895,−128046296,172,16,70,−88,307,
1,2014,5,4,0,17,50,18,52,
2,2014,5,24,6,19,57,43,563,
3,0,0,0,0,0,0,0,0,0,0,0,0,0,0,0,0,0,11,8,0,0,0,0,0,
3,1,0,0,0,0,0,0,0,0,0,0,0,0,0,0,0,0,0,0,0,0,0,0,0,
3,2,0,0,0,0,0,0,0,0,0,0,0,0,0,0,0,0,0,0,0,0,0,0,0,
3,3,0,0,0,0,0,0,0,0,0,0,0,0,0,0,0,0,0,0,0,0,0,0,0,
3,4,0,0,0,0,0,0,0,0,0,0,0,0,0,0,0,0,0,0,0,0,0,0,0,
3,5,0,0,0,0,0,0,0,0,0,0,0,0,0,0,0,0,0,0,0,0,0,0,0,
3,6,0,0,0,0,0,0,0,0,0,0,0,0,0,0,0,0,0,27,261,0,0,0,0,
4,gpsFixLastTimeTag(year,month,day,hour,minute,second),rangeResidual 5,networkFixLastTimeTag(year,month,day,hour,minute,second),rangeResidual Notice that the 16 meter sigma means average is accurate around the transmitter and can be used to identify that part of the store, as the store is more than 100 meters in length.

Since the reference point has a good sigma (16 meters) for a beacon ID which should have maximum range of 100 m, and 70 observations of location is the average, the location is satisfied and can be used for navigation.

The reference point data is a collection of the histogram data structure presented above. A cell ID would have base station information instead of MAC address and SSID. Typically, the WiFi reference point library may be 5000 elements in size to cover the area around where a person normally works and lives. The cell ID data base may be 2000 points.

The data base may be maintained as follows
1. It is shared with the server to enable crowd sourcing.
2. It is cleaned periodically to remove points that have only been observed one time or have inconsistencies, possibly due to spoofing.
3. It can also be sorted so that the points closest to home or work are at the top of the array so they can be found fastest.
4. The tables can also be organized by latitude,longitude squares or cities so that the search for a reference point can be minimized, saving calculation time and minimizing power consumption.
5. The table can also be downloaded from a crowd sourced server. For example, if the home base is in the San Francisco Bay area and a person travels by car to the Los Angeles area, the app can detect that the current location is out of range of the home base and can make a request to the server for the reference points around the current location.
6. The home base table is not searched until returning home.

Verifying Phone is at a Particular Location by Comparing Data Against a Store Sensor Observation In some cases, a location trajectory from a home base provides confidence that the person possessing the phone is the indeed the phone owner. This might be needed in a credit card transaction at a point of sale where it is desired to know that the credit card holder is indeed at the point of sale and that the credit card is not stolen. In some cases, the calculation time to upload the data on demand and process it in the cloud may impose a wait time for validation that is too long, such as 30 seconds. An alternative to verifying that the phone owner is at the point of sale is to compare the phone owner's sensor data against sensor data from a phone that is owned or controlled by the store or credit card company. The store's data is collected with a smart phone from the store manager or employee and this data is shared to server and associated with the store. The data is associated with the store by the store owner clicking that they are in the store, or by associating a specific beacon ID with the store. The data can be collected in real-time to account for changes in nearby beacons, or it can be collected periodically in case the data is changing slowly.

This system works because the sensor data obtained in a certain area is unique: the cell tower IDs and operator information is unique, the HW ID of a beacon's transceiver (like Bluetooth or WiFi) is unique. If enough unique sensors are observed by two smart phones, then these two smart phones must be collocated, without needing to know the exact location. This solution is much lower power and faster than requiring a request of a network fix from the OS which might also not provide an exact location.

The present systems and methods will find myriad uses and applications, among them the following:

Insurance: Usage-Based Insurance (UBI); Activity-Based Insurance (ABI)

Without requiring continuous GPS fixes, the infrequently collected network fixes can be used to determine an average location of the APs. Then when the APs are re-visited, the location is known. But then using the inference of driving mode from the accelerometer, the locations of the APs can be used to determine a rough trajectory that is then map-snapped to determine a very accurate distance traveled. This will provide a very low power method of driving distance when driving in usual locations. For new driving locations, an infrequent GPS fix is used when the network fix is not available to establish a rough trajectory and to also determine average locations for APs on the new route. The accelerometer provides jerk estimates that are integrated to provide acceleration and speed and are used to identify the style of driving (e.g., hard braking, hard turning). This low power method means the app can remain persistent without requiring the user to start the application or worry about the high power consumption of using the GPS receiver.

Credit Card Verification

A continuous tracking system as described herein has a major advantage over an on-demand solution. It can establish regular domicile points or occupation points where a customer spends a considerable amount of time. Via a dialog generated after confidently predicting a base location, a customer can validate that these points are home or work and therefore establish that the address a person validates is their proper address. Thus, a small business owner can use this capability to add credibility to his interactions on the web. Then, when a customer travels from his home base to point of sale with a credit card, it can be verified that the customer has had a verifiable connection back to a legitimate home base for his card, thereby establishing that the presenter of the credit card is its rightful owner.

This capability adds credibility to a person's ability to do web based commerce. When at a computer and using a credit card, the seller can verify identity by sending a message to the mobile electronic device to verify the transaction or by verifying that computer's registered location is close enough to the mobile electronic device's current location or other validated reference points.

A credit card company at the time of sale can verify that the point-of-sale location is the same as the current location of the phone holder and that this phone has arrived from the card holder's registered unique location generated at the time of card registration.

Figure 9:
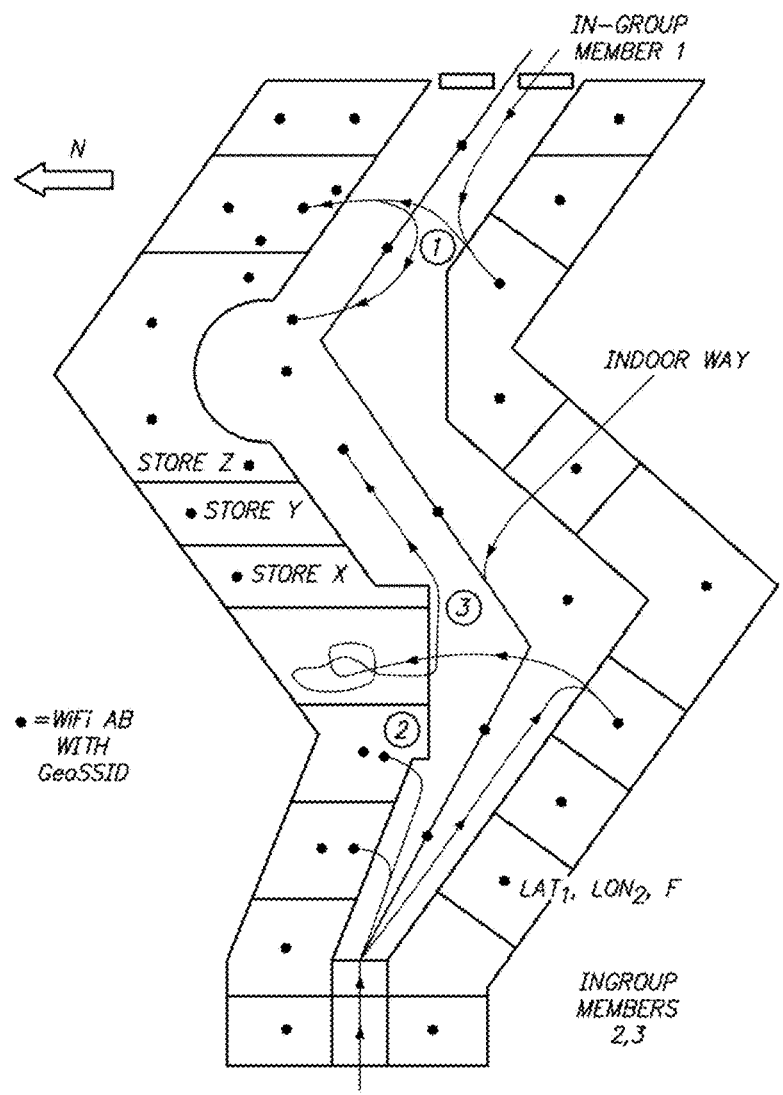

Social Groups (FIG. 9)

Referring to FIG. 9, a diagram is shown of an indoor location (e.g., shopping mall) with a number of WiFi access points (APs) indicated by dots. Paths are shown of different in-group members entering the mall from different areas. In-group members 2 and 3 enter from the same door, whereas in-group member 1 enters from a different side of the building. In this example, for each in-group member, the system records the geoSSIDs that were strongest or selected by the WiFi. (A geoSSID is an SSID that includes latitude/longitude information.) As a result of the system monitoring the progression of each in-group member, each in-group member can know how far and in what direction each member is. They use a function provided to compute the range to and bearing between latitude/longitude pairs. Each in-group member computes the distance to every other in-group member this way and shares this information via the internet periodically. Knowing the direction, each member can walk to every other member. When a member wants to walk to another member, the member holds the phone with normal orientation with the screen visible and the top of the phone (the y-axis) forward. In this way, the current direction can be known, and the direction to turn can be computed as the computed bearing to the member minus the current direction. Assume, for example, that in-group member 1 is on the east side of the mall. In-group member 3 can use their magnetometer to know current orientation and walk to the member 1. Circles 1, 2 and 3 indicate the positions of the group members at the relevant time. For member 3, the direction to member 1 is due east. If member 3 is looking due south, then the direction to turn is 90−180=−90, which is a turn to the left.

Social Verification

Data may be shared between the user and outside the world via a protected API. The outside world cannot access the data. However, based on user configuration, outside parties can pose different qualitative questions to the data via a textual API. For example, does the person frequently go out on Friday nights? The data base receives the question from the server along with an applet that knows how to search the data. It runs an algorithm to compute if the user is away from the home base on Fridays. The answer is returned with a score of 1 to 100 with a confidence. An answer might be a score of 25 with confidence of 95. This means that person only goes out 25% of Fridays, and there is high confidence that the answer is correct. Or a data service can ask, "Is the person active?" The applet is run to compute the percent of time in parks, running, biking, etc. Then the data base is examined and the score is returned. If the person drives between home and work, and rarely walks, the answer might be 1 with a confidence of 95 for example. Thus, an active person looking for a good match would not select this person. If a user wants to share with social media that the user did his or her running three times a week, then an applet is downloaded and the data base is examined. If running was generally only once a week over 50 weeks duration, the answer might be 30 with a confidence of 99, meaning there was almost never three runs in a week.

It will be appreciated by those skilled in the art that the present invention may be embodied in other specific forms without departing from the spirit or essential character thereof. The foregoing description is therefore intended in all respects to be illustrative and not restrictive. The scope of the invention is indicated by the appended claims, not by the foregoing description, and all changes which come within the meaning and range of equivalents thereof are intended to be embraced therein.

APPENDIX A

Usage based car insurance (UBI) is becoming more prevalent due to availability of low cost modules that can installed in and powered by the On-Board-Diagnostics (OBD) port found in most cars in recent years. These modules contain at least an accelerometer for measuring the car's driving dynamics and a cellular modem for uploading the data. There is fee for using a particular carrier's network and this, on top of the hardware and administration fees, must be paid by the insurance company.

Vehicles in the near future will have a telematics device installed in the car's infotainment computer separate from the OBD port. The telematics device will have a cellular modem to provide internet connectivity and services. It may contain multiple inertial sensors including an accelerometer, and a location determination capability, or have access to the vehicle's sensor and location information via the secondary CAN bus. The main consumer of this data can be the car company, the hardware provider, or a general purpose application platform that allows $3^{rd}$ party applications to run on an infotainment computer. Thus, it may be possible that the insurance company can save cost by running their application on the infotainment computer where the HW and connectivity is available without charge. It many cases, it will be $3^{rd}$ parties that monetize the data and the car owner only benefits from the data through these channels.

A type of mobile phone known as a smart phone has most or all of the sensors and location capabilities available in the OBD or in car telematics devices. The number of auto driver who have smart phones is much higher than the number of vehicles that have such telematics capabilities. Thus, it could be advantageous to the car owner to generate a similar observation of driving characteristics on their smart phone, and maintain control and ownership of the data through an independent $3^{rd}$ party who could manage storage and safe dissemination of the data so that the phone/car owner can monetize or directly benefit from the data through discounts.

The user could shop their data for the best price across multiple insurance companies.

In some states in the United States, it is not permissible to use location information with UBI (besides zip code) to set insurance rates. However in many other states, and many countries, it is allowed. Location determination on a smart phone is common but continuous use has significant impact on the ability of the phone to operate all day without recharging.

While GPS could be considered a possible solution for driving analysis, it has some drawbacks. Accelerations are not directly sensed in a GPS receiver, and can only be determined by differencing the speed estimate. The accuracy of GPS is degraded in urban environments where the number of satellites with direct path is reduced. Smart phones currently are using GNSS chipsets where satellites from the United States system are combined with the Russian, Chinese, Japanese and European satellite systems. This does improve availability but it comes at the cost of higher power consumption. For this application, GNSS is best used infrequently to verify that the phone is moving and to get a rough distance traveled. Logic is needed to determine when to request the location. It is the one of objects of this invention to do this based on measured information so that the phone can request a new fix based on some characteristic of the vehicle trajectory.

For continuous analysis, an accelerometer is a better solution as it can measure acceleration at a high rate, such as 15 times per second, with low power consumption. It is always generally on in the smart phone as it is used as in the screen orientation control. Thus, using this sensor should not add additional power use.

Besides UBI, smart phone owners can share other information about places they frequent and get discounts from marketers who are trying to acquire them as likely customers. These are the type of information that location based telematics apps would be trying to acquire and sell to marketers. Thus, the smart phone owner can do the same self-marketing with the data that is normally available on their smart phone. It is also possible that new markets can be opened for sharing such data where the owner is rewarded by entities such as the local city government for acquiring city use patterns or for determining domicile for school eligibility.

While it is certainly possible that the vehicle's data will be generally available from ever more convenient methods of access, there is benefit for the user to have their own observation of their driving analysis and memory that is synchronized with more context and information about the user. Here the phone provides more context about the user as it used a much higher percentage of time than the telematics device in the car.

In case the user does not drive, the application on the phone can measure the methods and characteristics all means of transportation, including walking, biking, using the bus and train. Such information can be beneficial for assessing life insurance rates based on activity levels, amount of walking at work, etc. Such information will not be available from a vehicle telematics device. Thus, the smart phone system has the capability to exceed the amount of data available from a car-installed device as the smart phone is carried nearly everywhere the user goes.

What is needed is a method to save user activity and information that has the following characteristics:

1) It can run continuously without intervention. It is too inconvenient to start the stop the application for each activity.
2) It does not require the phone to be oriented or operated in any fixed way.
3) It should not require frequent or continuous use of higher current sensors or frequent use of GNSS.
4) The user has control over which data is retained, how long the data is retained, and in what manner the information is shared with $3^{rd}$ parties.

Application persistence achieves the first characteristic. An app is launched one time at power (possibly automatically) so the user need only start it one time per power cycle.

The second requirement is achieved with a method of attitude determination that can calibrate automatically and autonomously in any orientation of the phone. There are few enabling observations. The first is to recognize that most driving motion is along the forward walking or driving direction in either a positive or negative sense. This allows the repeated accelerometer ratio values to be classified as along the forward direction and allows the offset between the arbitrary phone attitude and the vehicles forward direction to be determined. The second enabling observation is to recognize that a positive acceleration is required directly after the vehicle leaves a static condition, and a negative acceleration is required to stop the vehicle and become static. This allows the acceleration to be calibrated to the correct sense of the navigation frame and allow the accelerations to be classified as turning right or left, and speeding up or slowing down and the relative amount of each. A third enabling observation recognizes that map matching between a known starting and end point only requires one point on each road to identify a trajectory that is permissible based on the road connections and directions or travel. The distance of travel can be more accurately estimated using the length of the trajectory's chosen road line segments than with the distance between fix estimates that can have varying amounts of measurement error.

Multiple parallel methods of phone body frame acceleration modeling are performed: a histogram of short term dynamics captures the sudden and huge changes and is reported and restarted regularly so no data is lost, a box-car averaged sensor difference provides a low noise estimate of the acceleration derivative that is integrated to measure acceleration free of gravity and offset errors. A cyclical movement detector and classifier detects walking to aid in framing driving times, and also to characterize the user's activity levels. A hand movement or attitude change detector looks for changes in attitude that look like hand movement or persist over a few seconds. Hand events don't stop driving periods, but they do mask the data to prevent it from being considered as driving dynamics. An attitude change event will restart the attitude reference for a drive to recalibrate to the new attitude. Walking will prevent a drive period from starting, and will close a driving period. Detection of not moving for a long time is called table mode and disables these methods to further save power. A driving detector looks for driving like accelerations and a static and dynamic detector help reset the accelerations to limit integration error. A driving validator summarizes any blocking condition on acceleration to mask human accelerations from the driving conditions.

The third requirement is achieved by using the accelerometer as the main sensor and not requiring constant use of location determination or constant use of other inertial sensors like the gyro or magnetometer. Battery life impact is also minimized by using exclusively integer based arithmetic in frequently used calculations, that is, at the accelerometer strobing rate which is generally more than 10 times per second. Floating point arithmetic and transcendental functions such as sine, cosine, square-root are not required as pre-computed tables can provide these functions and complete with few instructions. The system also listens for available aiding information from WiFi Scans, Cell phone IDS, locations updates invoked by the phone operating system. WiFi Scans can be used for aiding the driving context and are requested every 10 seconds when not in table mode. Magnetic compass can be strobed at a low rate, such as once per 5 seconds to aid in location trajectory validation. Processing this data provides redundancy and can validate the context produced. The driving dynamics are fed back to the location determination logic to delay the update period when the vehicle does not changes streets, and speed up the time to the next update when a turn is detected. These two characteristics enable distance traveled to be calculated reliably by having at least one location per road segment separated from the last segment by a turn.

The forth requirement for user control requires an interface to enable calculation of various conditions and to remove or allow certain data to be accessible to $3^{rd}$ parties. Data can be made only local to the phone and not saved for simple observation. Conversely, data can be saved daily on an external server and business logic analytics can be run to identify key information like time spent at work/home/away from home and levels of activity. These data can be selected and transferred to a work server to get credits for different activities.

One aspect of the smart phone method that must be overcome to measurement driving characteristics is the fact that the phones sensors will observe the superposition of hand movement or sliding of the phone on top of the desired driving movement. In general these movements (events) are limited induration in relation to total driving period, and a significant statistical sampling is achieved in the gaps between these events.

The above can be achieved by isolating the non-driving data, such as holding the phone, walking, or changes of attitude of the phone. Any time this happens, the data is blocked until stability is re-achieved, at which a new session is commenced. The session continues until the next non-driving event which also triggers a new session.

Before acceleration events can be analyzed as turning, or straight ahead motion, or both, the attitude of the phone must be determined with respect to the vehicle's navigation frame. The attitude is generally described with the Euler angles of pitch, roll, and yaw. Once known, the accelerations in the phone's body frame can be converted into accelerations in the navigation frame of the car or person moving forward, right, and up. Thus, turning, speeding up or slowing down can be determined without requiring an higher power sensor such as GPS or a gyro.

On the phone, the attitude reference must be defined. Pitch and roll are both zero when the phone is on its back facing up. Pitch is 90 degrees when the phone is standing on its base and −90 when standing on its top side. Roll is singular when pitch is at +/−90. Here roll is 0 when the phone's display is faces up or 180 when the phone's display is facing down. Roll is 90 when the phone is standing on its right side (with respect to the screen) and roll is −90 when it is standing on the left side. At these points, pitch is also close to zero.

The Accelerometer Bias

The 3D body frame acceleration in each axis is estimated as the value above or below the bias in that axis due which is the dot product of that axis with the down gravity vector. When face up on a flat surface, the z axis reads minus gravity while the other axes are close to zero. A method known as leveling is often used to estimate these bias points in each axis when the phone is static. After the bias is known, the acceleration is defined as simply the accelerometer value minus the bias.

The Accelerometer Slope Method

The implementation used in this work is to remove the bias by differencing the accelerometer values between two epochs separated in time. This difference is proportional, through the time difference, to the jerk (the derivative of acceleration). It will be referred to as the slope. The integrated slope provides produces an acceleration estimate relative to the time the integration was begun.

The Filtered Slope

The slope is estimated between two epochs separated by medium time interval, such as one or two seconds, so that a small steady slope is observable when the slope times the time interval is larger than the single observation noise envelop. Small slopes are harder to seen between consecutive differences. A finite impulse response filter is applied to the slope trajectory to produce smooth acceleration trajectories that are more monotonic and more stable for sorting of extrema.

Acceleration Events

The high and low peaks are the extrema and are used to define acceleration events. The peaks are processed some time later their occurrence when the acceleration either has a sign change (a zero crossing) or an inflection point, when the deviation down from the current peak hypothesis exceeds a first threshold and then has rebounded back towards the peak by second smaller threshold. Sometimes it takes a few seconds for the strobe to occur as the acceleration drops slowly in magnitude. It is necessary to avoid strobing too early as the extrema detection logic might retrigger on the decay of the same event that was just strobed. Preferably, each extrema should be processed only one time.

Assume the time difference between each consecutive reading is dt seconds, usually 0.067 seconds for an average of 15 Hz.

Slope and Acceleration Definition

In each axis: accelSlope($t$)=sum($n$ from 1 to 32)

[accelerometer($t-n*dt$)−accelerometer($t-(32+n)*dt$)]

Accel=sum(from 0 to $t$)[accelSlope($t$)]

To get the real jerk value, there is a conversion by the time interval and slope sum factor, as well as another factor that accounts for the time between the samples.

JerkRealValue={[accelSlope($t$)/32]/(32*$dt$)}m/s$^3$

To get a real acceleration value, there is a conversion by the jerk conversion factor and then a multiply of time difference to account for the sampling rate of dt. This has the effect of canceling the dt in the jerk conversion yielding a simple conversion by 32*32.

AccelRealValue=[accel/(32*32)]m/s$^2$

Navigation to Body Frame Conversion

Consider an x,y,z coordinate system for the phone body frame with the phone [same as Google's] on a flat surface with the display up, then positive x is to the right side, positive y is to the top, and positive z is out of the display. Using equation 2.43 from Aided Navigation, GPS with High Rate Sensors, by Jay A. Farrell, McGraw Hill, and converting the u,v,w system to the phone's x,y,z, and also converting Farrell's North,East,Down frame to Forward, Turn, Up where positive forward being North, right turn being East, and Up being-Down we get the conversion (for any vector, here shown as acceleration Ax,Ay,Az) from F,T,U to the phone's body frame as:

$$Ax=[-\cos R \sin H - \sin P \sin R \cos H]*F + [\cos R \cos H - \sin P \sin R \sin H]*T + \cos P \sin R*U$$

$$Ay = \cos P \cos H*F + \cos P \sin H*T + \sin P*U$$

$$Az = [-\sin R \sin H + \sin P \cos R \cos H]*F + [\sin R \cos H + \sin P \cos R \sin H]*T - \cos P \cos R*U$$

Here cos and sin represent cosine and sine, and P,R,H are pitch, roll, and heading offset, which represents the offset between the forward direction of the phone in the y-axis to the forward axis of the vehicle known as the North or Forward axis.

If F is positive, then the car is speeding up. If T is positive, then the car is turning to the right, and if U is positive, the car is going up-hill. The pitch and roll, P and R can be assumed known as they are estimated directly from the raw accelerometer values Gx,Gy,Gz that still have the gravity vector effects on top of the body axis acceleration and are defined using the equations in Farrell 10.14 and 10.15

$$\text{Roll}=a \tan 2(-Gx,Gz) \text{ where a tan 2 is a four quadrant a tan(sin/cos)}$$

$$\text{Pitch}=a \tan [Gy/\text{sqrt}(Gy^2+Gz^2)] \text{ where a tan is a two quadrant a tan(sin/cos)}$$

In this analysis, this pitch definition produces a negative pitch when the phone display is rotated from the flat table to standing up. A minus pitch transformation is applied to Farrell's equations and is already incorporated above. It only impacts the sin P terms. The up and down navigation axes are also opposite which produces a minus 1 factor that is applied to the z axis.

To determine the driving data of turns and speeding up and down, the two unknowns F,T must be estimated. However, we have 4 unknowns (F,T,U and H) and only 3 measurements (Ax,Ay,Az), so the equations cannot be solved directly. The unknown U is a nuisance variable for the purposes of knowing the driving data, but it is needed in case the driving has up and down roads due to hills, which is common. The heading H is the 4$^{th}$ and key unknown and the most difficult to estimate in that there is not a linear connection between the navigation and body frame. That is, it is observed non-linearly through the sine and cosine functions. It must be solved for first, along with U second, so that F and T can be solved.

Determine Accurate Pitch and Roll Estimates

The roll and pitch are considered as known. They are computed directly from the raw accelerometer values. The pitch and roll estimates deviate from the true values when there is acceleration and these deviations need to be filtered out in order to obtain stable roll and pitch estimates. A possibly solution is to simply average the values, or filter them more heavily when the values are changing and less when the values are constant. However, in slow turns, the change can be small and the deviation remains as high as 30 degrees. It has been found that a maximum likelihood estimator produces an estimate with lower error. A pitch histogram is used to store all the pitch values and a roll histogram is used to store all the roll values over a long period and the filtered pitch and roll estimates are taken as the peak of the pitch histogram and roll histogram respectively. Both have histogram bin sizes of a few degrees so that the quantization can be overcome by averaging about the peak. A minutes worth of values (60 secpmds*15 Hz=900 points in the histogram) will generally have a peak at the correct value and the acceleration induced errors will spread out away from the peak value. Consecutive histogram estimates can then be further low pass filtered to produce very accurate pitch and roll estimates that are not affected by the accelerations of turning and speeding up and down.

Detect Attitude Changes Due to Slip or Hand Movements

Attitude changes due to holding the phone or the phone slipping must be detected and handled. Attitude changes can be detected with either a large change in the epoch based pitch and roll values using a large threshold such as 35 degrees between values a few seconds apart, or with a smaller threshold on the one minute histogram values. If a change is found, any acceleration events are banned or ignored until the attitude can be declared stable again. Care must be taken to not declare an attitude change from the roll axis when the pitch is close to +/−90 as the roll is unstable here and changes quickly for even small accelerations without any attitude change.

Define Three Cases for Attitude

Assuming now that stable pitch and roll are available, the current attitude is classified as being one of three possible cases. Three cases are defined as follows:

Case 1) Pitch and roll both less than +/−60 degrees. Use approximation that sin P sin R is small.

$$Ax=-\cos R \sin H*F+\cos R \cos H*T+\cos P \sin R*U \quad \text{(num axis)}$$

$$Ay=\cos P \cos H*F+\cos P \sin H*T+\sin P*U \quad \text{(den axis)}$$

$$Az=-\cos P \cos R*U \quad \text{(up axis)}$$

Case 2) Pitch more than +/−60. Here roll is either 0 or 180, so cos R=+/−1, sin R and cos P are small.

$$Ax=-\cos R \sin H*F+\cos R \cos H*T+\cos P \sin R*U \quad \text{(num axis)}$$

$$Ay=\sin P*U \quad \text{(up axis)}$$

$$Az=\sin P \cos R \cos H*F+\sin P \cos R \sin H*T-\cos P \cos R*U \quad \text{(den axis)}$$

Case 3) Roll more than +/−60. Here pitch is nearly zero, so sin P=0 and sin R is small.

$$Ax=+\cos P \sin R*U \quad \text{(up axis)}$$

$$Ay=\cos P \cos H*F+\cos P \sin H*T+\sin P*U \quad \text{(den axis)}$$

$$Az=-\sin R \sin H*F+\sin R \cos H*T-\cos P \cos R*U \quad \text{(num axis)}$$

Notice that in each case, there are two dominant axes having a mixed connection to F,T,U and a single subdominant axis having a direct connection to U.

A key step towards estimating H is to exploit the first key assumption that most acceleration in a car is along the forward axis, where F>0 (accelerating to speed up) or backwards where F<0 (accelerating to slow down). Assuming T=0 and by canceling the U effect which can be estimated from the subdominant axis, the dominant axis equations can be rearranged to expose the sin H and cos H terms and then H can be estimated with an arc-tangent of sin H/cos H. The axis with sin H in the F coefficient is referred to as the numerator axis (num) and the axis with cos H in the F coefficient is referred to as the denominator coefficient as the sin and cos are the numerator and denominator of the arctangent function that will be used to estimate H.

The impact of any up (U>0) or down acceleration (U<0) caused by travelling on hills can be mitigated by estimating U directly with the single subdominant axis that observes only U. The U estimate is then used to remove the impact of the vertical acceleration on each of the two dominant axes.

Thus, for each acceleration event, a U estimate is estimated from the subdominant axis acceleration divided by its U coefficient. It is then removed from the other two axes by post scaling the U estimate by the U coefficient in each of the dominant axes.

All of the cases can be represented with a unified format. Define the axes for each case as follows:

num axis=dominant axis that has sin H in the F term coefficient
den axis=dominant axis that has cos H in the F term coefficient
up axis=subdominant axis that only has U term coefficient Define the coefficients of the F,T, and U unknowns in the three body frame axes as follow:

$F_{num}$=coefficient of F in the num axis
$T_{num}$=coefficient of T in the num axis
$U_{num}$=coefficient of U in the num axis
$F_{den}$=coefficient of F in the den axis
$T_{den}$=coefficient of T in the den axis
$U_{den}$=coefficient of U in the den axis
$U_{sd}$=coefficient of U in the sub dominant axis Obtain an estimate of U by defining:
$A_{up}$=sub dominant acceleration from the up axis $$U\hat{} = A_{up}/U_{sd}$$

Obtain an estimate of H by defining:
$A_{num}$=acceleration from the num axis
$A_{den}$=acceleration from the den axis $A^c{}_{num}$=a dominant acceleration from the num axis compensated for the U effect=$A_{num}-U_{num}*U\hat{}$ $A^c{}_{den}$=a dominant acceleration from the den axis compensated the U effect=$A_{den}-U_{den}*U\hat{}$ $SF_{den}=F_{num}/\sin H$ (notice that the den subscript on $SF_{den}$ is opposite its source)

$SF_{num}=F_{den}/\cos H$ (notice that the num subscript on $SF_{num}$ is opposite its source)

Finally, the heading estimate using the accelerometer event is defined as:

$$H_{accel}\hat{} = a \tan \{[A^c{}_{num}*SF_{num}]/[A^c{}_{den}*SF_{den}]\}*180/PI$$

PI=3.14159

The magnitude of the acceleration in the in the horizontal plane is determined using the compensated acceleration from the dominant axes as shown below.

$$\text{accelMag} = [(A^c{}_{num})^2 + (A^c{}_{den})^2]^{1/2}$$

This square root is implemented with the well-known JPL square root approximation. That approximation says: if A=sqrt($I^2+Q^2$), then if X>=3Y, then A=X+Y/8, else A=7/8X+Y/2. All of these factors can be executed with modulo-2 shifting rather than multiplies. Such instructions are low power and do not require larger blocks of silicon for advanced functions such as multiply and divide.

This will be referred to as:

$$\text{JPL\_SQRT}\{X,Y\}=[X^2+Y^2]^{1/2}$$

Reference: [An Improved Digital Algorithm for Fast Amplitude Approximations of Quadrature Pairs, B. K. Levitt and G. A. Morris, Communications Systems Research Section, Jet Propulsion Laboratories, Pasadena Calif., tmo.jpl-.nasa.gov/progress_report2/42-40/40L.PDF]

To minimize calculation (and save time and power), the a tan function is implemented as a pre-computed table of 511×511 elements of a tan 2[row][col] with a +/−0.5 degree accuracy where row is the sine address (the numerator or sine value) and col is the column address (the denominator or cosine value). The absolute value of the numerator and denominator, which are both integers and are products of an integer acceleration times a cosine or sine integer, are both down shifted one bit at a times until both values are less than 512. The resulting values are then the row and column indices into the table lookup. The count of negative values of the numerator and denominator is made when obtaining the absolute values. If the count is one, then the table result is negated. This produces a two-quadrant a tan with a range of +/−90 degrees without requiring a divide or system call to a floating point arc tangent function.

Similarly, a table is computed that converts an integer angle in degrees into the sine and cosine of the angle with a 10-bit integer. A second table also computes 1/cosine (angle) and 1/sin(angle) where the angle is in integer degrees. These terms are used to avoid using a divide which require significantly more instructions or power to compute than a multiply. Thus, all the coefficients can formed with a multiply rather than a divide. The impact of the multiply can also be further minimized by making each multiply fit into a short integer (16 bits) so that the multiply can fit into 32 bits and use a smaller DSP multiply block or fewer instruction.

The heading estimate, that is, the heading offset between the phone's forward axis and the vehicle's forward axis must be filtered in order to determine an accurate value. The acceleration events where the vehicle is turning (T is not zero) produce errant heading estimates. A time series of H estimates will have a uniform error spread between +/−90 degrees with a peak at the true value. As with pitch and roll, a maximum likelihood estimator is deployed to find the peak. Given enough time, the forward and backward accelerations should occur more often than the turns and will produce a peak (the most common value) in the histogram.

A Benefit of the Slope Data

It is desirable to learn the heading offset as fast as possible, so as to generate turn events that drive the location determination logic. In order to reduce the time it takes for the histogram to yield a confident peak, the slope extrema events are also used to produce heading estimates that can be put into the heading histogram. It has been observed that the slope measurements are more precise than the acceleration estimates in that there is no integration error.

$J_{num}$=dominant axis jerk (acceleration slope) from the num axis
$J_{den}$=dominant axis jerk (acceleration slope) from the den axis
$J_{up}$=sub dominant jerk acceleration from the up axis $$U\hat{} = J_{up}/U_{sd}$$

$J^c{}_{num}$=a dominant acceleration from the num axis compensated for the U effect=$J_{num}-U_{num}*U\hat{}$ $J^c{}_{den}$=a dominant acceleration from the den axis compensated the U effect=$A_{den}-U_{den}*U\hat{}$ $$H_{jerk}\hat{} = a \tan \{[J^c{}_{num}*SF_{num}]/[J^c{}_{den}*SF_{den}]\}*180/PI$$

Notice that the vertical up or down jerk effects are removed from jerk based H estimate using the compensated slopes in the same way as the acceleration vector. This means calibration can be achieved in any driving condition.

Finding the Histogram Best Estimate

A heading estimate is taken as the histogram peak (or average peak very near the peak value) which is high enough above a second peak that is also far enough away enough from the first peak. The second peak cannot be close to the first peak. Sometimes the driving trajectory will have many turns of the same direction and this can generate a number of similar heading estimates that are correlated but far from the true value. Thus, the histogram logic must choose the threshold between the peak and second peak according to the second peak value and its distance from the peak: a larger second peak that is distant from the first peak requires a higher threshold between the two peaks. A smaller second peak or one that is still close to main peak tolerates a smaller threshold.

Define the histogram based heading estimate of H as:
$H_{histo}\hat{}$=Heading estimated from the peak of the histogram with inputs from $H_{accel}\hat{}$ and $H_{jerk}\hat{}$.

An Alternative Solution

IN case a gyro is available on the mobile device, it can be enabled briefly as an alternative to identifying the heading offset. It must remain on as the histogram is being populated. The gyro can identify turns. If it identifies a turning period, then the heading estimates are not put into the histogram during that time. Alternatively, if it is determined that there is not turning, then the heading estimates are weighted more strongly. After the histogram is satisfied, then the gyro can be disabled. But a 3D gyro is not available in all mobile phones and it also requires some higher current, processing of the data, and possibly calibration. But a solution is still needed to estimate the heading in case the gyro is not present.

On flat and mostly straight road conditions, the histogram will have only one dominate peak driven by the speed up and slowing down accelerations. In general, the histogram is only trusted if there in one dominant peak that is twice as large as the other peaks away from the dominant peak.

In practice, there is a contour or inclination on most roads and the accelerometer can sense these as turns as the vehicle slants down and back up the incline. These events can add consider noise to the histogram and impact the assumption that most acceleration is forward for speeding up or slowing down.

A key observation is to notice that the forward and backward accelerations generate a common angle (because the slowing down has sign changes that are cancelled in the two quadrant a tan function) whereas the incline generates what look like more random turns and thus, have a more time varying heading estimate.

An additional set of four hypothesis cases are performed based on the magnitude and sign of the acceleration or jerk components from the dominant axes. The cases are:
1) numerator axis much larger than denominator (covers cases alpha is beyond +/−45 out to +/−90) (by a factor of 2)
2) denominator axis much larger than numerator (covers cases where alpha is near 0 and out to +/−45) (by a factor of 2)
3) numerator and denominator similar size (within a factor of two) and same sign (for cases where alpha is around 45 degrees)
4) numerator and denominator similar size (within a factor of two) and opposite sign (cases where alpha is around −45 degrees)

On getting a new numerator and denomintor, and alpha (the heading estimate), then
1) Identify which case this alpha corresponds to
2) Compute the deltaAlpha=alpha−last alpha for this case seen
3) Make an RMS filtered value=means square value of deltaAlpha.
4) Calculate the average of the positive alphas, and the average of the negative alphas for each case.
5) Identify a large distance between positive and negative alphas as an invalid case
6) Identify the average of positive and negative alphas as the final estimate. For cases 3 and 4, there will generally be only one estimate, positive or negative, whereas for case 1 and 2, there will generally be two. Also, for cases 1 and 2 the angles will be complimentary, that is opposite signs but same absolute value.
7) Over time, the case that best matches the truth will have a lower RMS, and will produce a good average.

A sample is shown below for two cases: the first where alpha, the heading offset, is zero, and the second where the heading offset, alpha, is close to 45 degrees. In the first case where the truth is 0 degrees, cases 3 and 4 are not allowed as they have complimentary estimates (42 and −43) that are centered around the case 2 estimate and have similar occurrences (48 and 69 counts), whereas case 2 has the a low RMS with a reasonable plus-minus distance. In the second case there the truth is 45 degrees, case 3 has the lowest RMS, the and case 4 which is nearly complimentary has few occurrences.

| case | case1 cnt | RMS | plus avg | cnt | minus avg | count | plus - minus | avg avg | |
|---|---|---|---|---|---|---|---|---|---|
| alpha = 0 | | | | | | | | | |
| 1 | 145 | 21 | 76 | 65 | −76 | 80 | −28 | 90 | |
| 2 | 120 | 15 | 7 | 70 | −10 | 50 | −17 | −1.5 | correct |
| 3 | 48 | 17 | 42 | 48 | 0 | 0 | NA | NA | |
| 4 | 69 | 13 | 0 | 0 | −43 | 69 | NA | NA | |
| alpha = 45 | | | | | | | | | |
| 1 | 31 | 22 | 69 | 19 | −79 | 12 | 44 | −75 | |
| 2 | 14 | 17 | 11 | 10 | −15 | 4 | −2 | −2 | |
| 3 | 84 | 10 | 45 | 84 | 0 | 0 | NA | 45 | correct |
| 4 | 22 | 17 | 0 | 0 | −46 | 22 | NA | −46 | |

The four cases hypothesis test is used in tandem with the basic histogram. If the histogram has a clear peak, then it is chosen. Otherwise, the four cases method is used.

After Having the Histogram Alpha

Having this histogram result allows acceleration events to be classified as either a turn, or acceleration along the forward axis. Solving for this parameter provides enough information to declare turn or no turn and set the fix update threshold for distance traveled based on the trajectory's shape.

Define the difference between the master heading estimate (based on the histogram) and the current heading based on the acceleration event as the absolute value of the angular heading difference in degrees as follows.

$$absDeltaHeading = |H_{accel}\hat{} - H_{histo}\hat{}|$$

When the absDeltaHeading is small, it is likely that the event is not a turn and is either a speeding up or slowing down along event along the forward axis.

If (absDeltaHeading <15)
Event is acceleration along the forward axis
Else
Event is a turn At this point, the simple heading difference provides the turn/acceleration forward decision and no further calculation is required to adjust the distance traveled threshold for the next location update.

However, it is useful to analyze the acceleration event further to provide more context of the event. To do this, the heading estimate must be converted from the two quadrant histogram result into a four quadrant value. It should be noted while a four quadrant histogram is possible, there is little benefit of doing so as the 180 degree ambiguity is better solved elsewhere. A four quadrant would have two correct peaks as the forward up and forward down acceleration would have a different value separated by 180 degrees. This would complicate the peak detection logic.

The 180 ambiguity in the four quadrant heading offset is determined using the second key assumption which is to use static mode as the anchor to test the sign of the acceleration in and out of static mode. The ambiguity sense is solved so that the dominant acceleration axes has best fit with the forward speeding up hypothesis since there should be a positive acceleration from stopped to moving. Conversely, a downward acceleration prior to static should produce an acceleration vector that has opposite signs to the $F_{num}$ and $F_{den}$ coefficients.

The four F and T coefficients are computed whenever there is a P,R, and two quadrant H update. No calculation is wasted here using the two quadrant heading as the ambiguity of 180 degrees will induce a minus sign on each of the coefficients as the sine and cosine of an angle plus 180 degrees is the minus of the result without the 180 degrees. Thus, the ambiguity simply flips the sign of each of the four coefficients.

A set of master P,R and H are maintained that are based on the time history of the histogram based P, R and two quadrant H estimates since the last attitude change. The difference of the new histogram outputs with any previous values are checked for jumps prior to blending into the master P,R, and H estimate. If the differences are small, a filtered value can be generated. Otherwise, the latest value is used as the current.

The four coefficients are the products of two sinusoids (or three sinusoids in the Az axis in case 2). These terms need only be computed one time when any one of the P,R, or H angles changes by more than one or two degrees. The $U_{num}$, $U_{den}$, $U_{up}$ coefficients need only to be computed when the P and R change by more than one or two degrees.

The expected forward speeding up acceleration vector for the current event with magnitude accelMag is:

$$A_{numSpeedUp} = F_{num} * AccelMag$$

$$A_{dendSpeedUp} = F_{den} * AccelMag$$

The expected slowing down acceleration for the current vector with magnitude accelMag is just the minus of the up assumption.

$$A_{numSlowDown} = -A_{numSpeedUp}$$

$$A_{denSlowDown} = -A_{denSpeedUpAccel}$$

The highest likelihood hypothesis has the best agreement with the measured accelerations and yields the smallest magnitude of the difference vector. Define the fit for the speed up (positive) forward acceleration hypothesis as:

$$D_{numSpeedUp} = (A^c_{num} - A_{numSpeedUp})$$

$$D_{denSpeedUp} = (A^c_{den} - A_{denSpeedUp})$$

Define MagSpeedUp=JPL_SQRT$\{D_{numUpSpeed}, D_{denSpeedSpeedUp}\}$

Define for fit for the downward (negative) forward acceleration hypothesis differences as:

$$D_{numSlowDown} = (A^c_{num} + A_{numSpeedU})$$

$$D_{denSlowDown} = (A^c_{den} + A_{denSpeedUp})$$

Define MagSlowDown=JPL_SQRT$\{D_{numSlowDown}, D_{denSlowDown}\}$

The method must wait for a static event, i.e., when the vehicle slows down, stops, and then speeds up again from the stop. This condition is determined using the accelerometer with static mode detection logic. The car has the lowest vibration when stopped, and so the logic is based on a high number of nearly consecutive occurrences of small accelerometer differences. A peak in the acceleration average slope above 3 m/s accompanied a minimum number of small accelerometer differences can also be used to indicate a rapid slow down and speed up in case without being exactly stopped. This case occurs commonly at stops signs when the driver does not come to a complete stop. The acceleration events time tagged before the static event time tag are the considered slowing down accelerations. The accelerations events time tagged after static event time tag are the speeding up accelerations.

If a slowing down to stop event is acquired, then the down accel hypothesis should have the best fit. If it does, then the ambiguity for this event is declared as 0. A counter of this ambiguity sense is incremented. If however the speeding up hypothesis had the best fit, then the heading ambiguity for this event is 180 degrees. A second counter of this ambiguity sense is incremented.

Similarly, if a speeding up after a stop event is acquired, then the up accel hypothesis should have the best fit. If it does, then the ambiguity for this event is declared to be 0 and a counter of this sense is incremented. If the down accel hypothesis is better, then the heading ambiguity for this event is 180 degrees and the second counter of this sense is incremented.

This logic is summarized below based on acquisition of accelerations around the static event.

If (slowing down to stop) {
If (magSlowDown<MagSpeedUp) then
ambiguityZeroCount=ambiguityZeroCount+1
else
ambiguity180Count=ambiguity180Count+1
}
else if (speeding up after stop) {

If (magSpeedUp<MagSlowDown) then
ambiguityZeroCount=ambiguityZeroCount+1
  else
ambiguity180Count=ambiguity180Count+1
}

It is possible that the event had unusually high error, or that the vehicle was in reverse when the counters are just being initialized. Thus, a counter for each ambiguity sense is made and the ambiguity is taken as the one that has the most occurrences. Except is the rare case of reverse driving, the correct value associated with forward driving should eventually win so the system is self-correcting. The ambiguity counters can also presented along with the results as a means of assigning confidence to the reported result.

The logic to determine the ambiguity based on the ambiguity counters is:
  If (ambiguityZeroCount>ambiguity180count)
    ambiguity=0
  Else If (ambiguity180Count>ambiguityZerocount)
    ambiguity=180

$$F_{num} = -F_{num}$$

$$F_{den} = -F_{den}$$

$$T_{num} = -T_{num}$$

$$T_{den} = -T_{den}$$

Else
    Ambiguity is unknown

Notice that the four F and T coefficients are negated in case the 180 degree ambiguity case is chosen.

The four quadrant heading estimate can be computed as the sum of the master heading (obtained from a time series of two quadrant histogram-based heading estimates) and the ambiguity. Notice that the four quadrant value isn't used directly in the F and T terms but rather impacts the signs of these terms used in the fit tests via the ambiguity handling above.

Four quadrant heading estimate $H^*$=master $H$+ambiguity

This heading is reported along with total attitude of the phone with respect to the vehicles forward, turn, and up axes.

Further classification of the acceleration event can now be performed now that the sense of the four F and T coefficients are known. It should be pointed out that when doing post processing analysis on a server (or on the phone if calculation is not an issue), it would be possible to go back and correctly classify all events as the ambiguity determined with all the data can be applied to the events that happened before the heading and ambiguity were available. This means an insurance application can do post processing on the reported events and do detailed analysis as to the direction of travel of vehicles in fender bender. This can help to determine who was going forward or reverse. This is useful in assigning responsibility to the party who ran into the other party who was in reverse.

One possible method of classification is to directly solve for the F and T parameters using the numerator and denominator equations to form a 2×2 matrix where the top row is the F terms, and bottom row is the T terms. This solution is sensitive to the sign accuracy of the weakest acceleration when the value is close to zero and can sometimes pick the wrong direction of an axis. This can be done during post processing.

The preferred scheme is one that matches the acceleration events with a discrete set of conditions to see which best fits the data. Such a test is more robust as it depends more on the strongest coefficient, and less on the sign of the weaker one in case it is close to the zero axis. This is implemented as a multiple hypothesis test where each hypothesis is assigned a magnitude based on the compensated acceleration minus the hypothesis estimate for that particular condition. The fit is magnitude of the difference vector. The hypothesis with the best fit, that is, the smallest magnitude, is chosen as the most likely.

The test proceeds as follows:

The event is first classified as having a turn or not a turn based upon the angular difference between the events heading estimate that is computed to populate the heading histogram and the current histogram based heading.

$$absDeltaHeading = |H_{accel}{\char`\^} - H_{histo}{\char`\^}|$$

If (absDeltaHeading>15 degrees) {
    Declare turn and further classify
  } else {
    Declare acceleration and further classify
  }

In case of turn, the type of turn and final classification of the event is chosen from the following hypotheses:
  1) Right turn
  2) Left turn
  3) Right turn with speeding up acceleration
  4) Right turn with slowing down acceleration
  5) Left turn with speeding up acceleration
  6) Left turn with slowing down acceleration Define the right turn hypothesis coefficients as:

$$A_{numRightTurn} = T_{num} * AccelMag$$

$$A_{denRightTurn} = T_{den} * AccelMag$$

The fit of this model to the data is a vector difference as follows.

$$D_{numRightTurn} = (A^c_{num} - A_{numRightTurn})$$

$$D_{denRightTurn} = (A^c_{den} - A_{denRightTurn})$$

Define MagRightTurn=JPL_SQRT{$D_{numRightTurn}$, $D_{denRightTurn}$}

The left turn hypothesis test magnitude is formed by negating the right turn coefficients and generating a new difference as follows:

$$D_{numLeftTurn} = (A^c_{num} + A_{numRightTurn})$$

$$D_{denLeftTurn} = (A^c_{den} + A_{denRightTurn})$$

Define MagLeftTurn=JPL_SQRT{$D_{numLeftTurn}$, $D_{denLeftTurn}$}

In case the right turn hypothesis has the best fit so far, (MagRightTurn<MagLeftTurn) then a right turn and speeding up accel hypothesis magnitude is tested by appending the right turn hypothesis factors with an additional factor based on the forward speed up hypothesis.

$$D_{numRightTurnSpeedUp} = (D_{numRightTurn} - A_{numSpeedUp})$$

$$D_{denRightTurnSpeedUp} = (D_{denRightTurn} - A_{denSpeedUp})$$

Define MagRightTurnSpeedUp=JPL_SQRT {$D_{numRightTurnSpeedUp}$, $D_{denRightTurnSpeedUp}$}

Define the right turn and slow down hypothesis vector by negating the up accel factors as shown below.

$$D_{numRightTurnSlowDown} = (D_{numRightTurn} + A_{numSpeedUp})$$

$$D_{denRightTurnSlowDown} = (D_{denRightTurn} + A_{denSpeedUp})$$

Define MagRightTurnSlowDown=JPL_SQRT $\{D_{numRightTurnSlowDown}, D_{denRightTurnSlowDown}\}$ Similarly, in case the left turn has a better fit that the right turn (MagRightTurn>MagLeftTurn)$_5$ the event can be further classified with up or down acceleration as follows.

Define the left turn speeding up accel hypothesis vector is:

$$D_{numLeftTurnSpeedUp} = (D_{numLeftTurn} - A_{numSpeedUp})$$

$$D_{denLeftTurnSpeedUp} = (D_{denLeftTurn} - A_{denSpeedUp})$$

Define MagLeftTurnSpeedUp=JPL_SQRT $\{D_{numLeftTurnSpeedUp}, D_{denLeftTurnSpeedUp}\}$ Define the left turn slow down hypothesis magnitude is:

$$D_{numLeftTurnSlowDown} = (D_{numLeftTurn} + A_{numSpeedUp})$$

$$D_{denLeftTurnSlowDown} = (D_{denLeftTurn} + A_{denSpeedUp})$$

Define MagLeftTurnSlowDown=JPL_SQRT $\{D_{numLeftTurnSlowDown}, D_{denLeftTurnSlowDown}\}$ Define the best case after testing the above cases as:

bestCaseSoFar=min{MagRightTurn,magLeftTurn, MagRightTurnSpeedUp,MagRightTurnSlowDown,MagLeftTurnSpeedUp,MagLeftTurnSlowDown}

In the case that the absDeltaHeading is less than a second threshold slightly higher than the turning threshold, it is favorable to also test the no turn hypotheses as an additional case 7,8. In this case, it is possible to undo the turn classification originally chosen when absDeltaHeading was above the first turn threshold. This makes sense as there might be some small error in the master heading histogram estimate.

In case absDeltaHeading<25 degrees, then two more hypotheses are added that do not have a turn:
7. Speed Up acceleration and no turn
8. Slow Down acceleration and no turn These cases have the same magnitude statistics as used to set the heading ambiguity for the speed up and slow down cases. They are treated slightly differently in order to avoid losing the turn classification to easily. In this case, it is required that that the magnitude have a much lower threshold than the best hypothesis so far in order to overtake it. In the other cases, the new minimum is taken regardless of how much lower it is than previous minimum.

The magSpeedUp or magSlowDown as define above during the ambiguity test section and can overtake the best fit so far if it is more than ¼ below the current best magnitude as show here:

If ((bestCaseSoFar−magSpeedUp)>¾ bestCaseSoFar)
bestCaseSoFar=magSpeedUp
else if If ((bestCaseSoFar−magSlowDown)>¾ bestCaseSoFar)
bestCaseSoFar=magSlowDown In case absDeltaHeading<=15, then the hypotheses are chosen from only one of two candidates.

bestCaseSoFar=min{magSpeedUp,magSlowDown}

In case turn right or turn left is chosen without any speed up or slow down component, then the magnitude of that turn is accelMag. Likewise, if speed up or slow down is chosen, the magnitude of that acceleration is accelMag. In case a mixed hypothesis is chosen, such as right turn with speed up, then the relative amount of each taken using the 4 quadrant heading H* is formed using the absDeltaHeading parameter. If the delta is zero, it means the event is along forward axis. If the delta is 90 degrees, it means the event is all turn. Between this range causes the turn magnitude to be split between the turn and the speed up or slow down. Notice all the values are positive. The hypothesis test result is used to indicate the sense.

Turn accel=accelMag*sin(absDeltaHeading)

Up accel=accelMag*cos(absDeltaHeading)

Such classification of these 8 possible states could be used by the phone to provide an audible warning to the driver when a certain type of turn occurred that was above threshold for that turn type.

The Distance Traveled Threshold

In case the application is interested in computing the distance traveled, an important purpose of turn detection logic is to drive the location determination logic for map matching. The acceleration in each axis is integrated to form a velocity estimate in each axis. The speed can be estimated using the modeling defined above and integrated to form a distance traveled.

Both dominant axes can be used to estimate the forward speed.

$$V_{num}\hat{} = V_{num}/F_{num}$$

$$V_{den}\hat{} = V_{den}/F_{den}$$

Speed^=[$V_{num}\hat{}+V_{den}\hat{}$]/2

Distance traveled=distance traveled+Speed^

A distance threshold is chosen to determine when to request a new location. The threshold is needed in order to achieve at least one point per road segment that has a turn above a certain angle. The distance threshold is initialized based on the area. For an urban area, where there are more streets close together, a smaller threshold is preferable. On the highway, where there are fewer nearby streets that can be accessed using a physically realizable trajectory from the set of streets, then a larger threshold is better. Without requiring the phone to know its road condition, an alternative method is to use the turns to set the threshold. When there are many nearby turns, then a location is requested at each turn, and the threshold is reduced. Conversely, when there are few turns, the threshold is increased and location is not requested until a much larger threshold is exceeded.

Detection of many turns can be implemented with a counter of the number of acceleration events between each turn event. If a larger number is observed, such as more than 20 speed changes before the turn, then the highway condition threshold is chosen. This logic is shown below.

If turn is observed
Request a new location if there is not a recent fix or a reference point
If (accelCntBetweenTurn<20)
Set distance traveled threshold=500 m (low Threshold)
Else if speed up/slow down event is observed
accelCntBetweenTurn+=1
if (accelCntBetweenTurn>=10) {
    set distance traveled threshold=2000 m (High threshold)
}

If distance traveled>distance traveled threshold

Request a New Location if there is not a Recent Fix or a Reference Point

Using Times and Corner Information with Map Information

The location data along with the turn events enable a map matching algorithm to identify each road segment traveled. Mainly the location data is used to determine the most likely connected road segment trajectory between the start and end points. In case the points are sparse in any area with more than one option, the turns can also be used, along with magnetometer heading and distance traveled from integrated speed from acceleration to generate a path to narrow the number of candidate road segments. After the fit is known, the turns are also used to calculate the time spent on each segment. Any time spent in static mode is removed from the segment time. An average speed can then be set and correlated to the segments speed limit which is given by the map.

The length of the segment divided by the time on the segment provides a reasonable average speed estimate. The times spent static indicate time spent waiting at stop lights or being stopped in traffic and are removed from the road segment duration when computed average driving speed. These events can be matched to type of intersection and the type of traffic control between a stop sign and traffic signal. A turn can also be assigned to an intersection along with stop times and whether the stop was a full stop or a partial stop, that is, a rapid slow down and speed up with less than a second between. A person should get good driving credit for making full stops at stops signs. Traffic signals could be correlated with city information to study mass movement verses different signal timing configurations. Using the speeding up or slowing down states and magnitudes determined with the turn detection, driving can be analyzed as aggressive or not.

APPENDIX B

Figure 10:
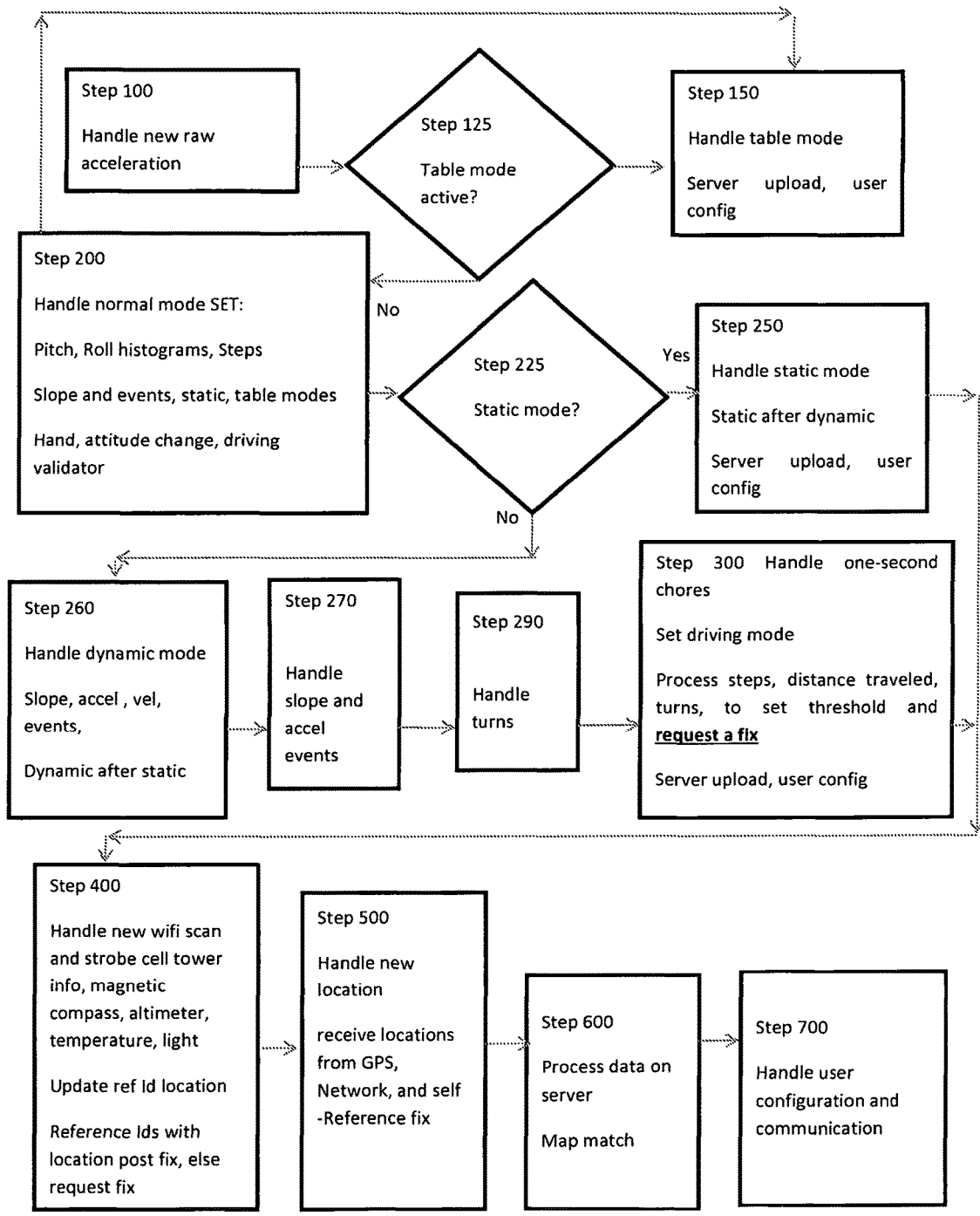
FIG. 10 is a flowchart illustrating aspects of operation of the mobile electronic device in accordance with one embodiment.

In which reference is made to FIG. 10.

Step 100 Handle new raw acceleration

Step 101 Convert acceleration and time tag into integer format

Step 102 Compute delta accel between current and last data if available

Step 103 Save new last data

Step 125 Test table mode. If true, go to Step 150. Else go to Step 200.

Step 150 Handle table mode

Step 151 Detect large delta accel and leave table mode

Step 152 Cancel drive mode if 5 minutes in table mode

Step 153 Maintain slow update of sensors, WiFi, cell site, environmental

Step 200 Handle normal mode (not table mode)

Step 201 Update delta accel histograms

Step 202 Step counting and reporting

Step 203 Compute raw pitch and roll and update histograms

Step 204 Compute histogram pitch and roll each minute

Step 205 Hand movement, attitude changes, and steps set drive validator

Step 206 Generate accel slope

Step 207 Generate accel slope extrema and events

Step 208 Determine static or dynamic mode.

Step 209 Determine table mode. If table mode, go to step 150.

Step 225 Test static mode. If true go to step 250. Else, go to step 260.

Step 250 Handle static mode

Step 251 Generate static event

Step 252 Null acceleration and speed

Step 253 Set waiting for next real dynamic to true

Step 260 Handle dynamic mode

Step 261 Update acceleration and velocity

Step 262 Generate acceleration extrema and events

Step 263 Update speed

Step 264 Detect $1^{st}$ accel event waiting for next real dynamic

Step 270 Handle slope and accel events

Step 271 Identify case 1, 2 or 3 and calculate coefficients if change in attitude Step 272 Compensate vertical in dominant axes Step 273 Update heading, heading histogram, and detect valid peak Step 274 Handle Peak available Step 275 Calculate coefficients if change in attitude data Step 276 Calculate heading change from histo heading Step 277 Handle small heading difference in acceleration event Step 278 Identify slow down or speed up at static and up ambiguity counters Step 279 Set ambiguity and confidence from ambiguity counters Step 280 Determine speeding up or slowing down state and magnitude Step 281 Report event Step 290 Handle large heading differences in acceleration event as turns Step 291 Identify turn right, turn left Step 292 Identify also speeding up or slowing down Step 293 Identify only speeding up or slowing for smaller heading differences Step 294 Calculate proportion of total magnitude to turn or speed up/slow down Step 295 Report event with complete attitude (four quadrant heading)

Step 300 Handle slow rate update each second

Step 301 Determine drive mode and events

Step 302 Integrate speed for distance traveled in drive mode

Step 303 Integrate steps for not drive mode

Step 304 Clear integrated speed or steps if new location is available

Step 305 Request location based on integrated speed or steps

Step 306 Configure sensors according to mode

Step 307 Check time to update data to server

Step 308 Check for user configuration

Step 400 Handle WiFi scan available

Step 401 Determine new Aps

Step 402 Determine repeating Aps, change in signal strength and determine average speed from WIFI Step 403 Determine lost Aps Step 404 Determine static mode or moving mode from WiFi Step 405 Strobe cell site and connection information, strobe blue tooth, strobe environmental (temperature, light, proximity, altimeter, etc)

Step 406 Update histrogram of times visited for each AP, or cell site or reference point IDs Step 407 Apply current location to IDs location if location is current Step 408 Request location with certain accuracy for strongest IDs that don't have a enough location information Step 409 Detect reference ID (WiFi Aps, Bluetooth) with enough location and post reference ID fix
Step 500 Handle new location data from GPS, Network, Reference
Step 501 Update latest for each source
Step 502 Pick best
Step 503 Update location for reference IDs requesting fix
Step 504 Satisfy fix request on accuracy
Step 505 Send location with context to ingroup members based on configuration
Context is usual place, work, home, walking, biking, driving.
Step 600 Process data on server
Step 601 Populate new data into correct phone storage
Step 602 Perform map match of daily and add to storage results as filtered location
Step 603 Process daily walking, biking, driving, home, work, types of transportation and add to storage
Step 604 Process requests from marketers
Step 605 Process requests from another user or in-group to compute common places seen or closet location per day or ever (friend factor)
Step 606 Process request to validate travel from a verified location to a point of sale
Step 607 Process request to validate location and time trajectory against common observations of reference points (WiFI APs or cell IDs, or Bluetooth IDs) from another user or in-group
Step 609 Process request from another user or in-group to share current or recent location
Step 700 Handle user configuration and communication
Step 701 Configure algorithms on off based on user selection
Step 702 Present statistics to user
Step 703 Present offers based on interest in the user

What is claimed is:

1. A method of using a mobile application running on a mobile electronic device comprising an accelerometer and having location determination capabilities to gather a data sequence of a user comprising location coordinate information, the method comprising:
monitoring received RF transmissions from a plurality of fixed-location devices;
at different times and places, determining and storing as a location database location coordinate information corresponding to a description of received RF transmissions;
in at least some instances, determining location coordinate information using the location database constructed by the mobile application or using a location database constructed by another mobile application running on another mobile electronic device; and
the mobile application or a device in communication with the mobile electronic device using the data from the accelerometer to perform verification of the location coordinate information, wherein the data from the accelerometer and the location coordinate information are obtained from independent sources.

2. The method of claim 1 comprising:
the mobile application using data from the accelerometer to perform at least one of:
steps tracking;
range accumulation; and
turn detection;
the mobile application obtaining location coordinate information on a discontinuous, as-needed basis in response to at least one of:
accumulation of a number of steps;
accumulation of a specified range; and
detection of a turn; and
the mobile electronic device or on a device in communication with the mobile electronic device:
using the location coordinate information, performing map matching; and
using results of the map matching to calculate a distance traveled.

3. The method of claim 2, wherein in at least some instances the location coordinate information is obtained using a locally stored database.

4. The method of claim 3, wherein in at least some instances, the location coordinate information is obtained using GPS or network fixes, further comprising cross-checking location coordinate information obtained using a locally stored database and location information using GPS or network fixes, whereby location spoofing may be detected.

5. The method of claim 4, comprising removing from the data from the accelerometer data attributable to said hand movement in preparation for further processing.

6. The method of claim 4, wherein the locally stored database has been cross checked on a server to remove low confidence reference points to eliminate possible spoofed reference points.

7. The method of claim 4, comprising using accelerometer data to identify hand use while driving.

8. The method of claim 3, comprising reducing power consumption by eliminating the need to request location information from the operating system.

9. The method of claim 8, comprising determining a private location profile that is not known by the operating system or other applications on the mobile electronic device.

10. The method of claim 2, wherein map matching is performed using sparse, discontinuous data.

11. The method of claim 10, wherein the sparse, discontinuous data comprises start point, end point, and locations nearby turns to determine permissible roads.

12. The method of claim 2, comprising:
detecting steps; and
in response, performing one of:
exiting a driving mode status; and
perpetuating a status other than driving mode status.

13. The method of claim 2, comprising the mobile application using the data from the accelerometer to perform verification of the location coordinate information, wherein the data from the accelerometer and the location coordinate information are obtained from independent sources.

14. The method of claim 2, wherein the accelerometer data is determined at a rate from two to 15 times a rate at which the location data is determined.

15. The method of claim 14, comprising using the data from the accelerometer to perform at least one of:
determining miles traveled to or from work;
determining miles traveled during work;
determining walking distance while at work.

16. The method of claim 2, wherein an application running on the mobile electronic device gathers the data sequence, and the application augments the data with a periodic time indicator enabling operation and non-operation of the application to be determined.

17. The method of claim 2, comprising:
detecting a driving mode; and
during driving mode:
in at least some areas that have been driven before, conserving power by deriving location data using a database of reference points stored locally on the mobile electronic device; and in at least some other areas, deriving location data using at least one of GPS and network fixes provided by a operating system of the mobile electronic device.

18. The method of claim 17, comprising:
detecting a static mode in which the mobile electronic device is stationary;
during static mode, reducing power consumption by not requesting location coordinate information from the operating system.

19. The method of claim 17, comprising:
detecting turns; and
using the absence of a turn to delay a request for location coordinate information from the operating system.

20. The method of claim 17, comprising using accelerometer data for categorizing driving behavior.

21. The method of claim 20, comprising categorizing driving behavior by:
producing map-snapped data;
associating acceleration events with map location according to time
information of the map snapped data.

22. The method of claim 17, comprising using accelerometer data for improving map matching with respect to corners and stops.

23. The method of claim 17, comprising operating in a private location mode based on previously determined locations.

24. The method of claim 23, comprising identifying locations of turns, speedup and slow-down with route rules such as stop signs and speed limit.

25. The method of claim 2, comprising:
detecting a driving mode; and
during driving mode, conserving power by detecting at least some turns using accelerometer readings only, comprising for each of a plurality of pairs of axes X, Y and Z, determining an estimated average acceleration ratio for the pair of axes.

26. The method of claim 25, comprising using acceleration ratios to distinguish between at least one of: a) right turns and left turns; and b) speeding up and slowing down.

27. The method of claim 25, wherein the mobile electronic device is a phone, comprising determining offset between phone body frame and navigation frame to distinguish between at least one of: a) right turns and left turns; and b) speeding up and slowing down.

28. The method of claim 2, comprising processing the data from the accelerometer to detect hand movement in which a user holds and moves the mobile electronic device.

29. The method of claim 2, comprising:
detecting steps; and
in response, performing one of:
exiting a driving mode status; and
perpetuating a status other than driving mode status.

30. A method of using a mobile application running on a mobile electronic device comprising an accelerometer and having location determination capabilities to gather a data sequence of a user comprising location coordinate information, the method comprising:
observing beacon transmissions of network access points;
checking a database stored locally on the mobile electronic device to see if location coordinate information is available on the mobile electronic device for the observed beacon transmissions;
if location coordinate information is available on the mobile electronic device, recording a location of the mobile electronic device according to the location coordinate information without requesting location from the OS and maintaining a private location trajectory; and
if location coordinate information is not available on the mobile electronic device:
obtaining location coordinate information for the observed beacon transmissions from one or more other sources; and
after one or more times of obtaining location information location coordinate information for the observed beacon transmissions from one or more other sources, storing the location information location coordinate information obtained from the one or more other sources for the observed beacon transmissions in the database stored locally on the mobile electronic device.

31. The method of claim 30, comprising obtaining location coordinate information for the observed beacon transmissions from one or more other sources multiple times, and storing the location coordinate information obtained from the one or more other source for the observed beacon transmissions in the database stored locally on the mobile electronic device, but using a location associated with the location coordinate information only if the location coordinate information for the observed beacon transmissions obtained from one or more other sources multiple times is in agreement.

* * * * *